United States Patent
Setz

(10) Patent No.: US 7,991,683 B2
(45) Date of Patent: Aug. 2, 2011

(54) CREDIT DATA PROCESSING SYSTEM FOR CONTROLLING ELECTRONIC TRADING BASED ON CREDIT ARRANGEMENTS

(75) Inventor: Karen Setz, Tarrytown, NY (US)

(73) Assignee: FX Alliance, LLC, New York, NY (US)

( * ) Notice: Subject to any disclaimer, the term of this patent is extended or adjusted under 35 U.S.C. 154(b) by 950 days.

(21) Appl. No.: 11/734,153

(22) Filed: Apr. 11, 2007

(65) Prior Publication Data

US 2007/0239595 A1    Oct. 11, 2007

Related U.S. Application Data

(60) Provisional application No. 60/791,135, filed on Apr. 11, 2006, provisional application No. 60/801,749, filed on May 19, 2006.

(51) Int. Cl.
*G06Q 40/00* (2006.01)
(52) U.S. Cl. .................................................. 705/37
(58) Field of Classification Search ............... 705/35–40
See application file for complete search history.

(56) References Cited

U.S. PATENT DOCUMENTS

| | | | |
|---|---|---|---|
| 5,136,501 A | 8/1992 | Silverman et al. | |
| 5,924,082 A | 7/1999 | Silverman et al. | |
| 6,985,883 B1 | 1/2006 | Togher et al. | |
| 7,003,488 B2 | 2/2006 | Dunne et al. | |
| 7,080,033 B2 | 7/2006 | Wilton et al. | |
| 7,130,789 B2 * | 10/2006 | Glodjo et al. | 705/37 |
| 7,184,984 B2 | 2/2007 | Glodjo et al. | |
| 7,225,150 B2 | 5/2007 | Wilton et al. | |
| 7,505,915 B2 * | 3/2009 | Silverman et al. | 70/37 |
| 2002/0138401 A1 | 9/2002 | Allen et al. | |
| 2003/0061069 A1 | 3/2003 | Silverman et al. | |
| 2003/0220868 A1 | 11/2003 | May | |

(Continued)

OTHER PUBLICATIONS

Ahuja, Ravindra K. et al.; Network Flows—Theory, Algorithms, and Applications; copyright 1993; chapter 9 (pp. 294-356); Prentice-Hall, Inc., Upper Saddle River, New Jersey; ISBN 0-13-617549.

*Primary Examiner* — Thomas Hammond, III
(74) *Attorney, Agent, or Firm* — Law Offices of Grady L. White, LLC

(57) ABSTRACT

A credit data processing system for controlling trades in an electronic trading system according to credit arrangements, comprising a computer-readable storage medium, an interface to an electronic trading system and a credit data processor. The computer-readable storage medium stores information representing the credit relationship network, including a plurality of credit entities in the network and a plurality of credit relationships existing between at least some of those credit entities. The system uses preferred counterparty rankings provided by the participating credit entities to determine and select the optimal credit paths to use for booking multiple-legged trades between credit entities even though the credit entities may not have a direct credit relationship. The system then checks each leg of the selected optimal credit path to verify that, taking into account the current net open positions on that leg, executing the trade required on that leg to carry out the proposed deal will not cause a credit limit associated with that leg to be exceeded. If the credit limit of any leg in the selected optimal credit path is exceeded, then the system will repeatedly try to find viable credit path based on the preferences specified by the credit entities involved in the trade, until a viable credit path is found or it is determined that no credit path that can accommodate the proposed deal without exceeding a credit limit currently exists.

32 Claims, 17 Drawing Sheets

U.S. PATENT DOCUMENTS

2004/0019553 A1 1/2004 Setz et al.
2005/0149428 A1 7/2005 Gooch et al.
2006/0053074 A1 3/2006 Wilton et al.
2008/0033865 A1 2/2008 Wilton et al.

* cited by examiner

CREDIT DATA PROCESSING SYSTEM FOR CONTROLLING ELECTRONIC TRADING BASED ON CREDIT ARRANGEMENTS

CROSS-REFERENCE TO RELATED APPLICATIONS

This application is related to and claims priority under 35 U.S.C. §119 to provisional application Nos. 60/791,135, filed on Apr. 11, 2006, and 60/801,749, filed on May 19, 2006, which are both incorporated into this application in their entirety by this reference.

FIELD OF ART

The present invention relates generally to trading foreign exchange instruments over a data communications network using an electronic trading system. More particularly, the invention pertains to systems and methods for checking, authorizing, monitoring and controlling credit arrangements between counterparties trading instruments on the electronic trading system.

BACKGROUND ART

U.S. Pat. Nos. 7,130,789 and 7,184,984 disclose a system for facilitating "multiple-hop" trades between two trading agents in a network of credit relationships, where the two agents initiating the trade do not have a direct credit relationship between them. The multi-hop trades, which are realized through the use of credit relationships with intermediate "credit-bridging" agents, are restricted according to credit limits associated with the intermediate credit relationships. For determining the actual flow of credit to complete a multi-hop trade, a central computer uses a minimum cost flow algorithm, where the cost to be minimized is a function of the actual cost to execute the trade and other factors, such as projected settlement costs, flow balancing heuristics, and a randomizing component. Ahuja, R. K., Magnanti, T. L., and Orlin, J. B., *Network Flows; Theory, Algorithms, and Applications* (Printice-Hall, Inc. 1993) U.S.A., at Chapter 9, contains examples and descriptions of such minimum cost flow algorithms.

There are significant disadvantages associated with allowing a central computer system to determine credit flows for multiple back-to-back trades according to a minimum cost flow algorithm. One disadvantage is that minimum cost flow algorithms rely too much cost and not enough on other significant business considerations, such as maintaining important, long-standing and mutually beneficial business relationships with certain trading counterparties. Trading entities often prefer to use these business relationships and deal with certain counterparties, despite the fact that doing so may require paying slightly higher or even significantly higher fees. Additionally, for business reasons having nothing to do with cost, trading entities frequently need or want to temporarily or permanently avoid using certain counterparties. It has been found that conventional trading systems that rely exclusively on minimum cost flow algorithms to determine the flow of credit, which in turn determines which counterparties will be involved in a proposed deal, do not give trading entities the control they need in order to properly manage these concerns.

Accordingly, there is considerable need in the electronic trading business for a system that permits the trading entities to determine the flow of credit in a credit relationship network (and therefore, the flow of assets) based on the counterparty preferences provided by the credit entities that are making the trades. It would be even more desirable for this system to be capable of successively falling back to less preferred counterparty preferences when the most preferred counterparties cannot accommodate a proposed trade.

SUMMARY OF THE INVENTION

The present invention addresses the above-described needs, as well as other disadvantages associated with conventional credit checking systems for electronic trading platforms, by providing a credit data processing system for controlling trade executions carried out on an electronic trading system based on existing credit arrangements. In general, a credit data processing system according to the present invention comprises a computer-readable storage medium, an interface to an electronic trading system and a credit data processor. The computer-readable storage medium stores information representing the credit relationship network, including a plurality of credit entities in the network and a plurality of credit relationships existing between at least some of those credit entities. Each credit relationship in the network comprises at least a credit limit, a preferred counterparty ranking and a net open position for the credit relationship. The credit data processor is configured to receive from the electronic trading system via the interface a request to confirm sufficient credit arrangements to permit processing of a matched pair of orders. Typically, the matched pair of orders includes a buy order received from a computer operated by a buyer credit entity in the credit relationship network, a sell order received from a computer operated by a seller credit entity in the credit relationship network, and an order amount. The credit data processor determines, based on the information stored in the computer-readable storage medium, a set of potential credit paths for the matched pair of orders, each potential credit path comprising a route through the credit relationship network that directly or indirectly links the buyer credit entity to the seller credit entity, each potential credit path comprising one or more credit legs corresponding respectively to one or more credit relationships in the route. Using one or more preferred counterparty rankings retrieved from the computer-readable storage medium to identify the appropriate credit legs, the credit data processor selects an optimal credit path from the set of potential credit paths for the flow of credit.

After selecting an optimal credit path, the credit data processor retrieves from the computer-readable storage medium the credit limit and net open position associated with each leg of the selected optimal credit path, and determines whether the sum of the order amount and the net open position on any credit leg in the selected optimal credit path exceeds the credit limit for that any credit leg, thereby creating a credit limit exception. If there are no credit limit exceptions, then the credit data processor sends a credit confirmation notice to the electronic trading system. But if there is a credit limit exception, the credit data processor deletes from the set of potential credit paths the selected optimal credit path and every other potential credit path that encompasses the credit leg that caused the exception. Then the path selection and credit limit exception testing steps are repeated as many times as required until the credit confirmation notice is sent or the set of potential credit paths is empty.

The invention allows members of a credit relationship network to make deals that result in trades with other members of the network even though no credit arrangements exist between the two members who initially requested the deal. These deals are accomplished by carrying out a series of "back-to-back" deals using credit intermediaries (e.g., prime brokers and broker-dealers) who are willing to extend credit to other members of the network. For a single proposed deal therefore, it is possible that the flow of credit (as well as the flow of assets) required to execute the deal must successively pass through one, two, several or even more credit intermediaries.

Given that some members of the credit relationship network may have credit arrangements with multiple credit intermediaries, there may be (and usually are) multiple credit paths along which the credit (and traded instruments) may flow in order to execute a proposed deal. Unlike conventional and prior art credit processing systems, however, the present invention gives members of the credit relationship network more control over the selection of the credit paths used for multi-legged deals by permitting the members to specify and rank preferred counterparties, and then use those preferred counterparty rankings to determine and select the optimal credit paths. Therefore, the credit paths used by the system to carry out a proposed deal are selected based on the counterparty preferences configured by the entities involved in the proposed deal, rather than, for example, a minimum cost algorithm, which could be, at least from the point of view of the counterparties involved in the deal, a far more abstract and possibly far less important consideration.

For example, credit entities participating in a credit relationship network operated according to the principles of present invention will typically provide, via a graphical user interface coupled to a credit administration module, a list of preferred counterparties the system should use when determining potential credit paths for those credit entities, as well as a ranking for each of the counterparties on the list. Thus credit entity A might specify, for example, that when there is a direct trade to be done, it prefers to try arranging the deal with credit entities B, C, D and E, in that particular order until the deal is successful, and not at all with credit entity F. In other words, credit entity B is credit entity A's most preferred counterparty, credit entity C is credit entity A's second most preferred counterparty, credit entity C is credit entity A's third most preferred counterparty, and so on. Computer systems configured to operate according to the present invention will receive and store this preferred counterparty ranking information, and then when it becomes necessary later to determine an optimal credit path for orders submitted by credit entity A, the system will first select and try to use the credit path that has credit entity A trading with credit entity B. If, and only if, that credit path fails, then the system will try to use the credit path that has credit entity A trading with credit entity C. If the credit path including credit entity C also fails, then the system will try to use the credit path that has credit entity A trading with credit entity D, and so on. However, the system will not select or try to use the credit path that has credit entity A trading with credit entity F under any circumstances, even if all of the other potential credit paths have been tried and failed, because credit entity A has essentially blocked credit entity F as a potential trading partner.

When a potential credit path is selected, the system checks each leg of that credit path to verify that, taking into account the current open positions on that leg, executing the intermediate trade required on that leg to carry out the proposed deal will not cause a credit limit associated with that leg to be exceeded. If the credit limit of any leg in the selected credit path is exceeded, then the system will repeatedly try to find and credit check another credit path based on the preferred counterparty rankings specified by the entities involved in the trade, until a valid credit path is found or the system determines that there are no credit paths that will satisfy the specified counterparty preferences and also accommodate the proposed deal without exceeding a specified credit limit.

A credit arrangement will be found to be sufficient when there exists one or more credit relationships in the credit relationship network that directly or indirectly links the buyer credit entity to the seller credit entity, and each of the relationships provides a credit limit that is not less than the sum of the current net open position and the order amount for the proposed trade. Typically, the request to confirm a sufficient credit arrangement will include one or more pieces of data pertaining to the matched pair of orders, including without limitation a buyer credit entity identifier, a seller credit entity identifier, a buy currency, a buy amount, a sell currency, a sell amount, a buyer order identifier, a seller order identifier, a deal type, and a value date. In some case, the request will include all of these pieces of data.

In response to receiving the credit confirmation notice from the credit data processor, the electronic trading system retrieves the selected optimal credit path from the computer-readable storage medium and executes a series of trades involving all of the credit entities in the selected optimal credit path. The credit data processor will then calculate, based on the order amount and the net open positions for the credit legs in the selected optimal credit path, a plurality of new net open positions for the credit legs used to execute the series of trades, and store the plurality of new net open positions in the computer-readable storage medium. In some cases, one of the parties who submitted one of the orders in the matched pair of orders (it could be the buyer credit entity or the seller credit entity), has made the order "contingent" on the submitter's acceptance of an offer to deal on the order. In these cases, embodiments of the invention may be configured so that the series of trades will not be executed by the electronic trading system until after the electronic trading system sends an offer to deal to the provider trading system and receives from the provider trading system an acceptance responsive to the offer to deal.

If the credit data processor does not find any credit paths directly or indirectly linking the seller credit entity to the buyer credit entity (the set of potential credit path is empty), or does not find any paths having a sufficient amount of available credit due to the current net open positions on one or more credit legs of the path, then the credit data processor will send a credit failure notice to the electronic trading system. Preferably, the credit failure notice includes information that will allow the parties to determine the reason for the failure, such as a credit failure type, a credit failure party, and an identifier for the orders for which the credit failed.

Credit data processing systems configured to operate according to the present invention may also include a plurality of connections to a respective plurality of computers operated by the plurality of credit entities, and a credit administrator module configured to (i) receive from the plurality of credit entities via the plurality of connections credit data pertaining to the plurality of credit relationships, (ii) generate the information representing the credit relationship network based at least in part on the credit data, and (iii) store the information in the computer-readable storage medium. The credit administrator module may also be configured to create the information based at least in part on credit data received from a centralized credit administrator. The connections between the credit entity computers and the credit administrator module may be established by using any conventional telecommunications technology, including, for example, wired and/or wireless wide area and local area networks, the Internet, virtual private networks, etc.

A credit data processing system according to the present invention may be programmed using, for example, a procedural programming model, an object-oriented programming model, or both. When a procedural model is used, the information stored in the computer-readable memory will typically comprise a database with a plurality of records, each record being configured to hold a plurality of values associated with a credit relationship in the plurality of credit relationships, including, for example, an identifier for the credit maker in the credit relationship, an identifier for the credit taker, an identifier for the credit account, a credit relationship type identifier, the credit limit, the preferred counterparty ranking and the net open position. When the object-oriented programming model is used, the information may comprise, for example, a plurality of credit relationship objects, each credit relationship object having a plurality of data members configured to hold the values associated with the credit relationship, the values again including an identifier for the credit maker in the credit relationship, an identifier for the credit taker, an identifier for the credit account, a credit relationship type identifier, the credit limit, the preferred counterparty ranking and the net open position.

In another aspect of the present invention, there is provided a method of using a computer processor to control trade executions carried out on an electronic trading system based on existing credit arrangements. The method comprises: (1) storing in a computer-readable storage medium accessible to the computer processor information representing a credit relationship network, the credit relationship network comprising a plurality of credit entities and a plurality of credit relationships between at least some of said credit entities, each credit relationship comprising a credit limit, a preferred counterparty ranking and a net open position; (2) receiving from the electronic trading system a request to confirm a sufficient credit arrangement to permit processing of a matched pair of orders, the matched pair of orders comprising a buy order received from a computer operated by a buyer credit entity in the credit relationship network, a sell order received from a computer operated by a seller credit entity in the credit relationship network, and an order amount; and (3) operating the computer processor to (a) determine, based on the information stored in the computer-readable storage medium, a set of potential credit paths for the matched pair of orders, each potential credit path comprising a route through the credit relationship network that directly or indirectly links the buyer credit entity to the seller credit entity, wherein each potential credit path comprises one or more credit legs corresponding respectively to one or more credit relationships in the route, (b) select an optimal credit path from the set of potential credit paths by using one or more preferred counterparty rankings to select credit legs for the optimal credit path, (c) if the sum of the order amount and the net open position on any credit leg in the selected optimal credit path exceeds the credit limit for that credit leg, delete from the set of potential credit paths the selected optimal credit path and every other potential credit path that encompasses that credit leg, otherwise, to send a credit confirmation notice to the electronic trading system, and (d) repeat steps (b) and (c) as many times as required until the credit confirmation notice is sent or the set of potential credit paths is empty.

BRIEF DESCRIPTION OF THE DRAWINGS

The present invention and various aspects, features and advantages thereof are explained in detail below with reference to exemplary and therefore non-limiting embodiments and with the aid of the drawings, which constitute a part of this specification and include depictions of the exemplary embodiments. In these drawings.

DETAILED DESCRIPTION OF EXEMPLARY EMBODIMENTS

With reference now to the figures, a detailed discussion of exemplary embodiments of the invention will now be presented. Notably, the invention may be implemented using software, hardware, firmware, or any combination thereof, as would be apparent to those of skill in the art upon reading this disclosure.

Figure 1:
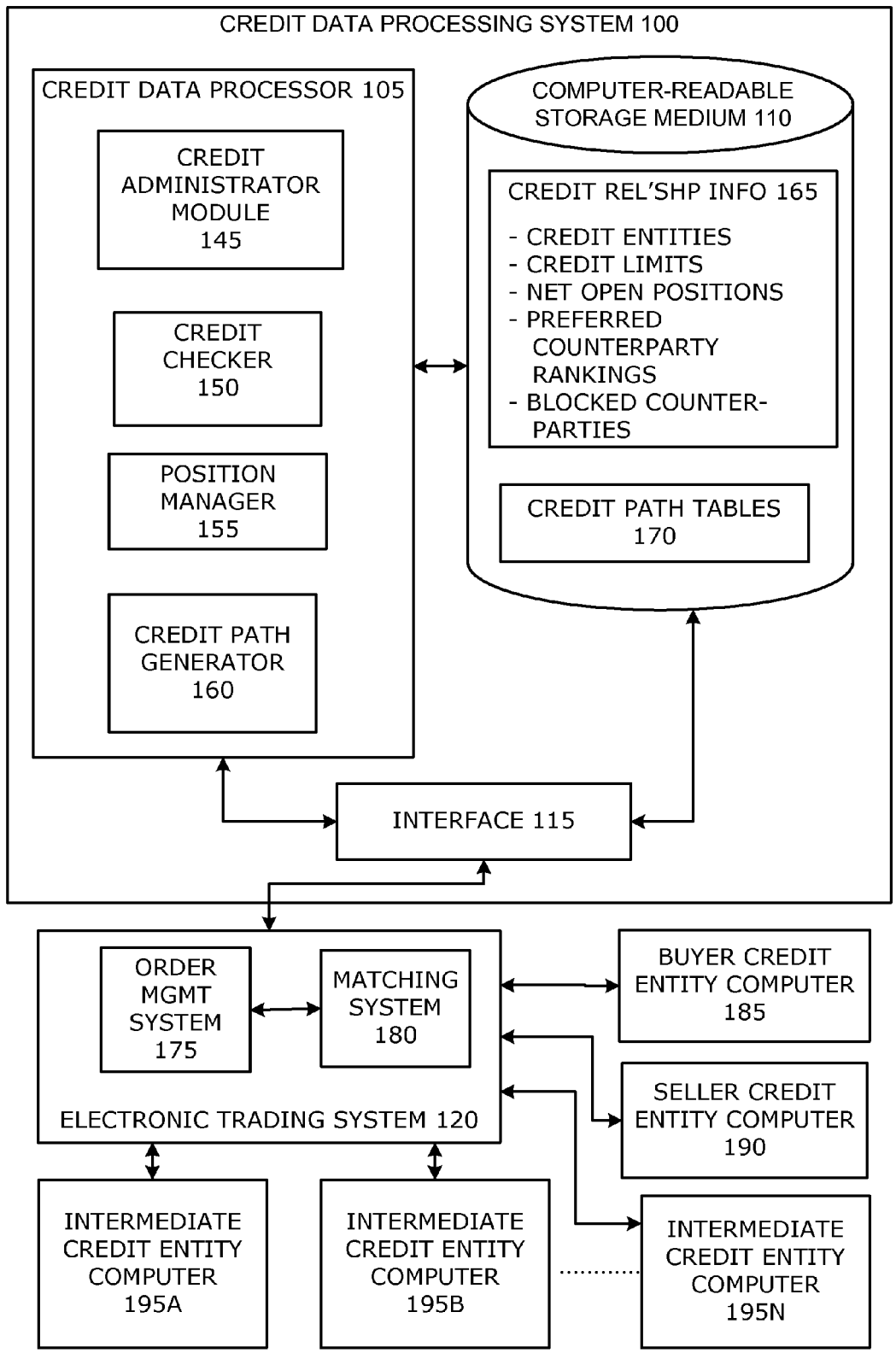
FIG. 1 contains a high-level block diagram illustrating the major functional components of a credit data processing system configured to operate according to an embodiment of the invention.

FIG. 1 contains a high-level block diagram illustrating the major functional components of a credit data processing system configured to operate according to one embodiment of the invention. In this embodiment, and as shown in FIG. 1, credit data processing system 100 comprises one element of a larger electronic trading platform that includes an electronic trading system 120, which itself is coupled (typically via a variety of Internet and World Wide Web protocols well understood in the industry) to a plurality of other computer systems, including computer systems operated by a buyer credit entity, a seller credit entity and a plurality of intermediate credit entities (shown in FIG. 1, respectively, as buyer credit entity computer 185, seller credit entity computer 190, and intermediate credit entity computers 195A, 195B through 195N).

For the purpose of simplifying the discussion that follows, FIG. 1 has been drawn such that the computer systems operated by the buyer and seller credit entities appear to be separate and distinct in function from the computer systems operated by the intermediate credit entities. It should be kept in mind, however, that this is not necessarily true in most cases. In fact, it should be readily apparent from the discussion below that, in most cases, a party that serves as an intermediary credit entity for a proposed multi-legged deal, by definition also serves as a buyer credit entity, a seller credit entity, or both, for his two legs for the same multi-legged deal. Moreover, it should also be understood from the discussion that follows that a party acting as an intermediary in one deal may serve as the ultimate buyer or seller in another deal.

Figure 2:
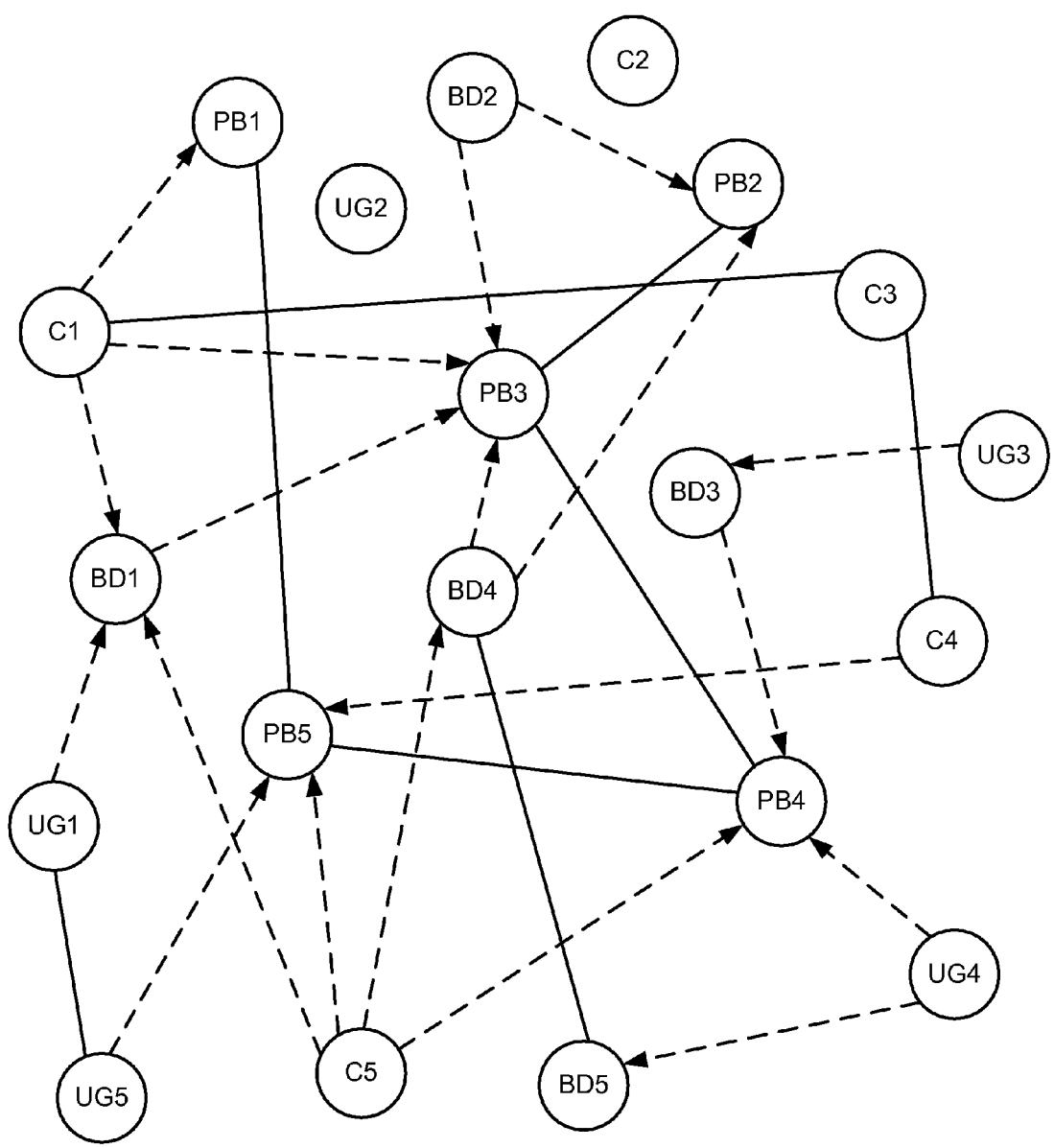
FIG. 2 is a graphical diagram of an exemplary credit relationship network.

Credit data processing system 100 includes credit data processor 105, computer-readable storage medium 110 and interface 115. Computer-readable storage medium 110 may comprise, for example, a local or remote, fixed or removable, permanent or temporary, magnetic or optical memory storage area or device, including without limitation one or more random access memory areas, cache memory areas, hard disk drives, tapes, DVDs, CD-ROMs, floppy disks or memory cards. Computer-readable storage medium 110 stores credit relationship information 165, which represents the details of a credit relationship network. An example of such a credit relationship network is shown in FIG. 2 and described in more detail below with reference to FIGS. 2 through 8B. Included in the credit relationship information stored in computer-readable storage medium 110 are data structures, records, variables, fields, object-oriented programming methods, and the like, which together represent in the computer system real world concepts associated with the credit relationships of the credit relationship network. Accordingly, the credit relationship information stored in computer-readable storage medium 110 typically includes information representing things such as identification information for the participating credit entities and preferred counterparties, dollar amounts for credit limits associated with credit relationships existing between the credit entities, current net open positions for the credit relationships, preferred counterparty rankings for the credit relationships, and identifiers for counterparties that have been blocked by the credit entities. Typically, all of this information will be initially set up and controlled by the credit entities or a central credit administrator by accessing and using a credit administrator module 145 of credit data processor 105. As will be explained in more detail below, computer-readable storage medium 110 also includes an area for storing one or more credit path tables 170, which will be accessed by other components of the electronic trading platform to store and retrieve potential and optimal credit paths generated by credit data processor 105.

As shown in FIG. 1, credit data processor 105 includes credit administrator module 145, credit checker 150, position manager 155 and credit path generator 160. Typically, credit administrator module 145 creates the credit relationships in the credit relationship network based on credit information supplied by participating credit entities, a central credit administrator, or both. Thus, credit administrator 145 is configured to receive from a credit entity and/or central credit administrator data input comprising a variety of credit account information, including, for example, preferred counterparties, preferred counterparty rankings, credit limits associated with those counterparties, counterparties that should be blocked from trading with the credit entity, and so on. Preferably, credit administrator module 145 collects this information via a plurality of network connections (not shown in FIG. 1 for simplicity) between credit data processing system 100 and the computers operated by a central administrator and/or the plurality of credit entities participating in the credit relationship network (such as buyer credit entity computer 185, seller credit entity computer 190, and intermediate credit entity computers 195A-195N). A variety of techniques for programming graphical user interfaces suitable for guiding human operators through the process of inputting the credit relationship data for use by credit administrator module 145 are well known and understood in the computer industry. Once the credit relationship data is received, credit administrator module 145 converts the data to information (e.g., populated databases, programming objects, and the like) that can be easily manipulated and stored by a computer system and stores the converted information in computer-readable storage medium 110.

Figure 14:
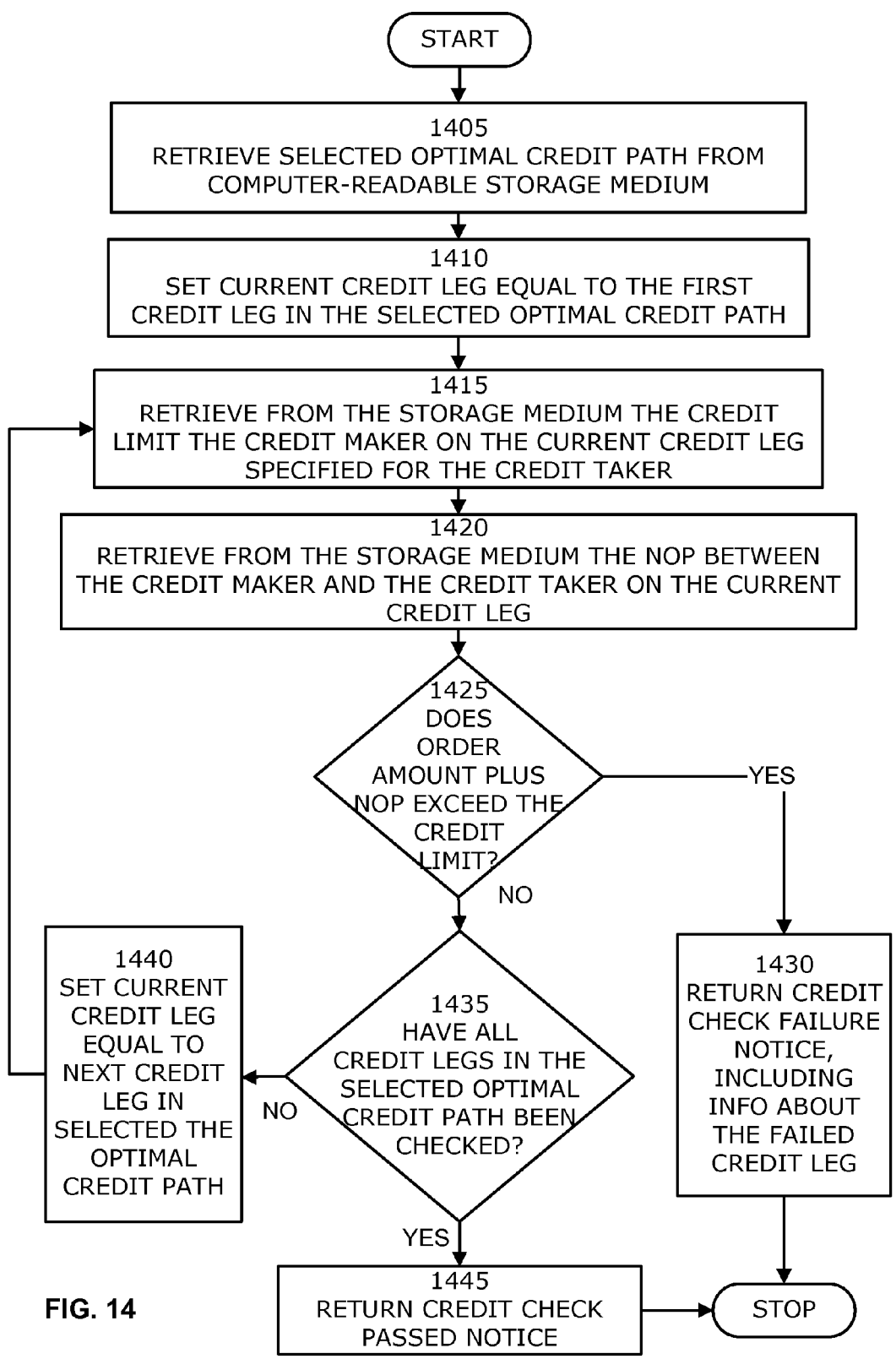

Credit checker 150 preferably comprises one or more software or hardware programs or processors programmed to execute one or more routines, functions or object-oriented programming methods to verify whether the sum of the proposed order amount for a proposed deal and the current net open position for a credit leg in a selected credit path for the proposed deal will exceed a specified credit limit for that credit leg. FIG. 14, explained in more detail below, contains one example of an algorithm credit checker 150 may be programmed to execute in order to carry out its credit checking function according to the principles of the present invention.

Position manager 155 maintains and updates an aggregate net open position for all currency positions for all credit relationships (i.e., credit legs) in the credit relationship network. In preferred embodiments, net open positions for foreign exchange instruments are calculated as follows:

$$NOP=MAX(SUM(\text{all long currency positions}), ABS[\text{all short currency positions}]))$$

Thus, if the net total for any currency is bought, the value for net open position will be a positive value, and if the net total for any currency is sold, then the net open position will be a negative value.

In preferred embodiments, the net open position is updated when: (1) a matched order passes its credit check for a selected credit path; and (2) the end of the settlement day for that matched order occurs. The end of settlement day is typically determined on a currency by currency basis and may be expressed, for example, in Greenwich Mean Time (GMT). This means that all matched orders with a settlement/value date of today will have their corresponding net open position updated today. Because matched orders for foreign exchange instruments have two currencies, each matched order is processed twice, once for each currency.

Figure 15:
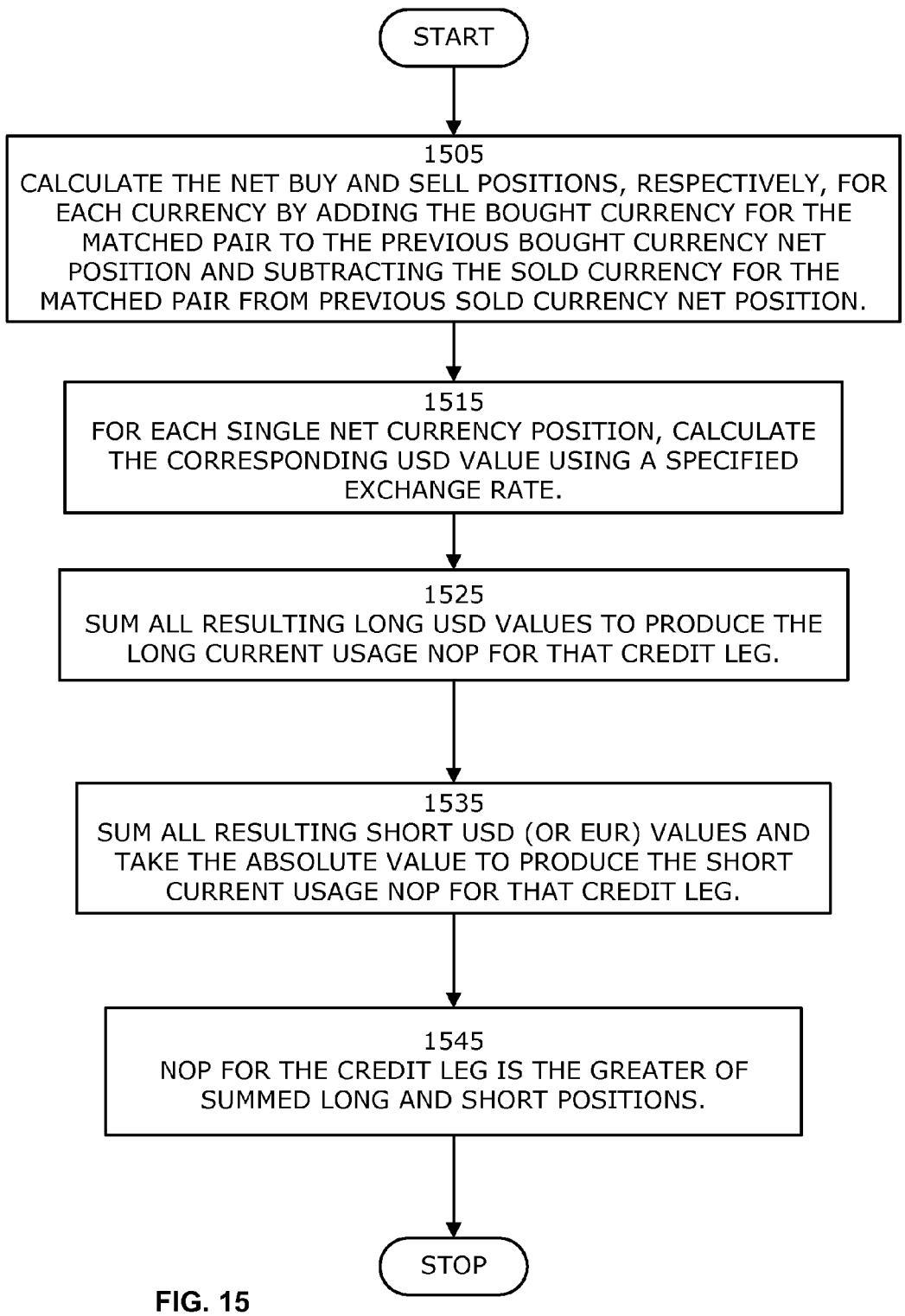
FIG. 15 contains a flow diagram illustrating the steps that may performed by a computer system, module or processor to calculate a new net open position subsequent to a credit limit checking operation.

The conversion rates used for converting order amounts to the currency used by a credit entity to specify the credit limit are typically those taken from the midpoint of an indicative price for each currency, as provided by a conventional foreign exchange rate feeder. Preferably, the current net open position for a credit leg is calculated using the aggregated positions of all the users of a credit entity, of all positions from both base and terms currencies, across all value dates (i.e., all active deals that are not yet settled). FIG. 15, described in more detail below, contains an example of the steps that may be performed by one embodiment of the present invention to calculate the net open position subsequent to a credit path credit leg limit checking operation.

Credit Path Generator 160 comprises one or more software or hardware programs or processors programmed to determine the set of potential credit paths for a matched pair of orders, and then to select the optimal credit path from the set of potential credit paths based on the preferred counterparty rankings provided by the credit entities that would be involved in the trades required to process the deal. FIGS. 9 through 13, which are described in greater detail below, contain flow diagrams illustrating by way of example the steps credit path generator 160 may be programmed to execute in order to determine and select optimal credit paths.

In preferred embodiments, credit data processing system 100 operates as a stand alone component that can be used with and by a variety of diverse electronic trading systems and applications that can benefit from invoking credit checks for proposed trades before those proposed trades are carried out.

To this end, it is preferable and more efficient to limit the number of external dependencies required for credit data processing system to function properly. Interface 115 comprises a programmatic mechanism (e.g., an application programming interface ("API") comprising libraries of subroutines and functions, object-oriented programming class definitions, and the like) by which credit data processing system 100 communicates with outside trading systems or applications, such as electronic trading system 120. Using an object-oriented programming model, for example, the interface may be defined to include methods that various components of the credit data processing system 100 must respond to. An example of one such interface definition will be described in more detail below.

Electronic trading system 120 typically includes an order management system 175 and an order matching system 180. Order matching system 180 matches orders received from the computer systems operated by buyer and seller credit entities participating in the credit relationship network (e.g., buyer credit entity computer 185, seller credit entity computer 190 of FIG. 1) based, for example, on currency, order size and price, and then, having found a matched pair of orders, submits a request to credit data processing system 100 to confirm sufficient credit arrangements for the matched pair of orders. If credit data processing system 100 returns a credit confirmation notice (along with the details of the selected optimal credit path), then matching system 180 will cause order management system 175 to carry out a series of trades using the credit entities identified in the returned credit path.

In some situations, one of the orders in the matched pair of orders sent to credit processing system 100 by electronic trading system 120 is a quote submitted by a foreign exchange "provider" who has designated his quote as "contingent." A contingent quote can be matched with an offer (frequently referred to as an "offer to deal") submitted by another party, but cannot be executed until the provider has had an opportunity to review and accept the offer to deal. Accordingly, preferred embodiments of the present invention are configured so that, upon receiving from credit processing system 100 a credit confirmation notice and selected optimal path pertaining to a provider's contingent order, electronic trading system 120 will send an offer to deal to the computer system operated by that provider, and then execute the series of trades using the selected optimal credit path only after the provider's computer system has responded to the offer to deal by returning a message indicating the provider's acceptance. In cases where the order submitted by the provider is not contingent, electronic trading system 120 is configured to execute the order automatically without sending an offer to deal or receiving a response thereto.

When the electronic trading system 120 has received everything it needs to execute the matched pair of orders, including the credit confirmation notice and credit path from credit processing system 100 and, if necessary, an acceptance from the provider trading system for a contingent order, it will typically send to credit processing system 100 a request to "commit" the order amount for the trades. Upon receiving the commit request, position manager 155 will add the order amount to the current net open positions for every credit relationship (i.e., every credit leg) used for executing the series of trades. This step insures that the next time credit path generator 160 selects a credit leg for a new credit path, the net open position for that credit leg will be up to date.

Although the embodiment shown in FIG. 1 shows credit data processing system 100 and electronic trading system 120 as physically separate components that are coupled together via an interface (interface 115), and a computer-readable storage medium that resides with the credit data processing system, it should be readily apparent from reading this disclosure that this particular physical arrangement may be modified without departing from the scope and spirit of the claimed invention. Therefore, computer and/or data communication systems wherein the credit data processing, electronic trading, interfacing and memory storage functions are carried out by fewer or more software programs or hardware devices, but which perform substantially the same functions as those described herein, are nevertheless consistent with and intended to fall within the scope of the invention as claimed.

Credit Relationship Networks

FIGS. 2, 3A, 4A, 5A, 6A, 7A and 8A show graphical representations of an example of a credit relationship network comprising a plurality of credit entities and a plurality of credit relationships (i.e., credit "lines") between at least some of those credit entities. In particular, the credit relationship network represented in FIGS. 2, 3A, 4A, 5A, 6A, 7A and 8A show credit relationships existing among and between a plurality of customer credit entities (designated C1-C5), a plurality of broker-dealer credit entities (designated BD1-BD5), a plurality of user groups (designated UG1-UG5), and a plurality of prime brokers (designated PB1-PB5).

FIGS. 2, 3A, 4A, 5A, 6A, 7A and 8A also show that at least two types of credit relationships may exist in such a credit relationship network: credit intermediary relationships and direct relationships. A credit intermediary relationship exists when the credit relationship is between a credit intermediary and a subordinate. When one party extends credit to a second party, the party extending credit is called the credit intermediary or "credit maker," while the party accepting the credit is called a subordinate or "credit taker." The credit intermediary (or credit maker) in the credit intermediary relationship takes the credit risk exposure on behalf of the subordinate (or credit taker) in exchange for a brokerage fee paid by the subordinate (credit taker) to the credit intermediary (credit maker). Typically, the credit intermediary (credit taker) in a credit intermediary relationship is a prime broker who has entered into an agreement to act as a credit-extending agent for a customer (such as a corporation), or a broker-dealer who has entered into an agreement to act as a credit-extending agent for a user group. The credit intermediary (credit maker) is also sometimes referred to as the "parent" in the credit intermediary relationship, while the subordinate (credit taker) is often referred to as the "child."

A direct relationship is a credit relationship between two credit entities where neither party pays a brokerage fee to the other party. Direct relationships arise, for example, when a large party or organization comprises distinguishable sub-units, (e.g., divisions, departments, groups or branches), who, for obvious reasons, have between them an agreement or understanding that trades with each other will not be subject to brokerage fees. However, direct relationships may also arise when the two parties are not legally related, but have nevertheless entered into an agreement not to charge each other brokerage fees for other business reasons. Accordingly, it is frequently the case that prime brokers have established direct relationships with other prime brokers, user groups have established direct relationships with other user groups, and customers (e.g., corporations) have established direct relationships with other customers, prime brokers and/or broker-dealers. The parties who are members of a direct relationship are often referred to as "peers."

In FIG. 2, as well as FIGS. 3A through 8B, credit intermediary relationships are represented by dotted lines with an arrowhead at the end connected to the credit intermediary (credit maker) in the relationship. Thus, as can be seen in FIG. 2, PB1 (which stands for "prime broker 1") is a credit intermediary (credit maker) and parent for C1 (which stands for customer 1). Conversely, C1 is a subordinate (credit taker) and child of PB1. On the other hand, direct relationships are represented in FIG. 2 by solid lines that do not have arrowheads. Therefore, for the exemplary credit relationship network shown in FIGS. 2, 3A, 4A, 5A, 6A, 7A and 8A, there are eight direct relationships (indicated by eight solid lines) and nineteen credit intermediary relationships (indicated by nineteen different arrowheads). The direct relationships for the example credit relationship network represented by the graph of FIG. 2 are shown in Table 1 below:

TABLE 1

Direct Relationships in the Credit Relationship Network of FIG. 2

| Counterparty 1 | Counterparty 2 |
|---|---|
| C1 | C3 |
| C3 | C4 |
| UG1 | UG5 |
| BD4 | BD5 |
| PB1 | PB5 |
| PB2 | PB3 |
| PB3 | PB4 |
| PB4 | PB5 |

The following table shows the credit intermediaries and subordinates for the nineteen credit intermediary relationships in the example credit relationship network represented by the graph of FIG. 2:

TABLE 2

Credit Intermediary Relationships in the Credit Relationship Network of FIG. 2

| Credit Intermediary | Subordinates |
|---|---|
| PB1 | C1 |
| PB2 | BD2, BD4 |
| PB3 | C1, BD2, BD4, BD1 |
| PB4 | C5, BD3, UG4 |
| PB5 | C4, C5, UG5 |
| BD1 | C1, C5, UG1 |
| BD3 | UG4 |
| BD4 | C5 |
| BD5 | UG4 |

Notably, two of the credit entities in the exemplary credit relationship network represented by FIGS. 2, 3A, 4A, 5A, 6A, 7A and 8A, specifically credit entities C2 and UG2, do not have any credit relationships (either direct or credit intermediary).

FIGS. 3A-B, 4A-B, 5A-B, 6A-B, 7A-B and 8A-B contain graphical diagrams illustrating some of the credit paths existing in the credit relationship network shown in FIG. 2 that may be selected by a credit processing system configured to operate according to the present invention in order to process a matched pair of orders submitted by credit entities C1 and C5. As indicated by the heavy lines and shaded nodes in FIG. 3A, one potential credit path links credit entity C1 to credit entity C5 along a credit path (i.e., "route") that includes credit entity BD1. In this case, the credit path has two credit legs corresponding to two credit intermediary relationships. In the first credit leg of the credit path shown in FIG. 3A, BD1 would be acting as a credit intermediary for C1. In the second credit leg, BD1 would be acting as a credit intermediary for C5. There are no direct relationship credit legs in this credit path.

Therefore, BD1 would be entitled to a brokerage fee from C1, from C5, or both of them, depending on the particular credit relationship arrangements. To execute a deal using this particular credit path, two back-to-back trades would need to be executed: a first trade between C1 and BD1, and a second trade between BD1 and C5, although not necessarily in that order.

Figure 3A:
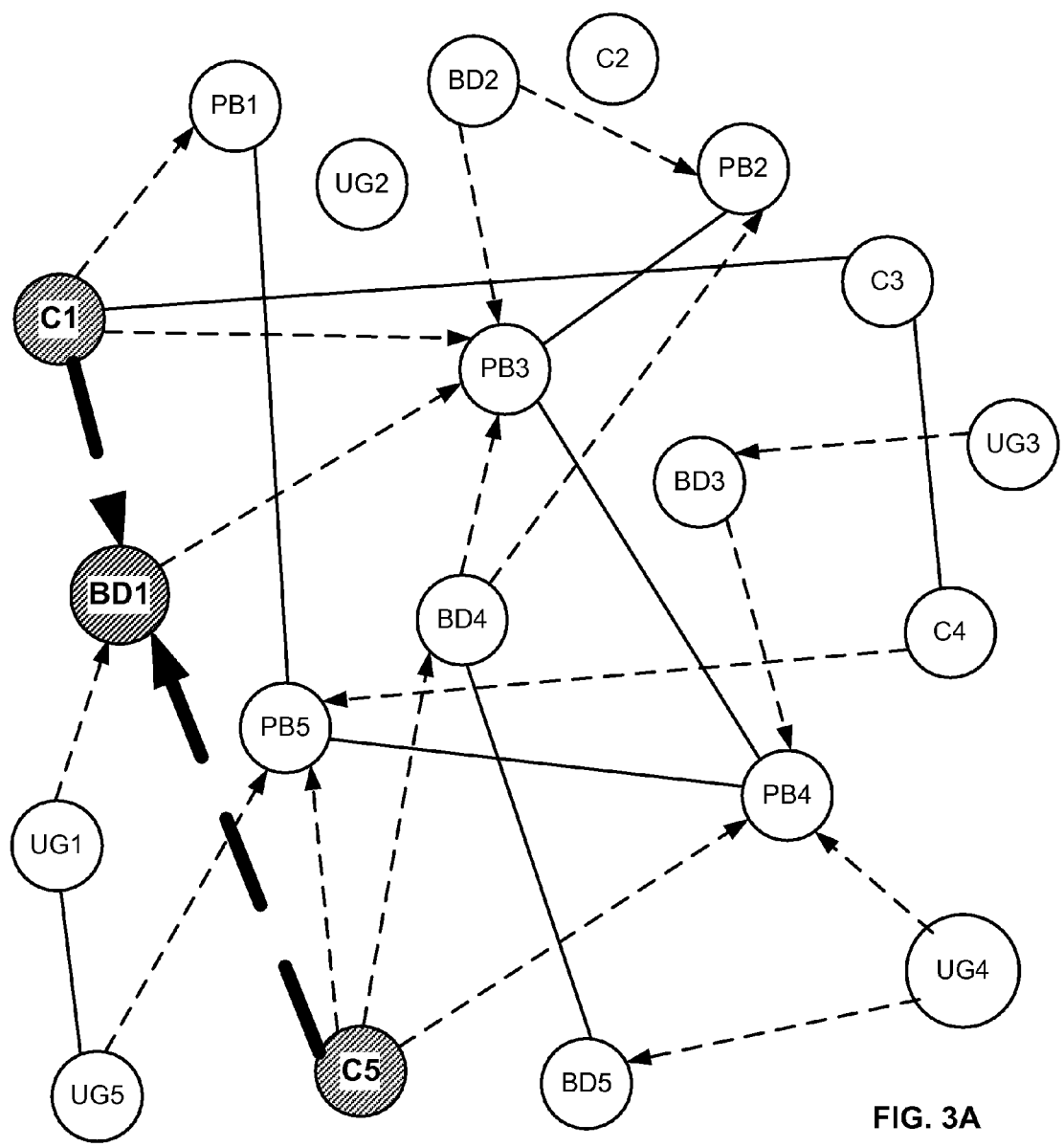
FIGS. 3A, 3B, 4A, 4B, 5A, 5B, 6A, 6B, 7A, 7B, 8A and 8B contain graphical diagrams illustrating a number of different credit paths (i.e., credit flows) that could be identified and/or selected by embodiments of the present invention in order to process a matching pair of trading orders submitted by two of the credit entities in the credit relationship network of FIG. 2 that do not have a direct credit relationship.
Figure 3B:
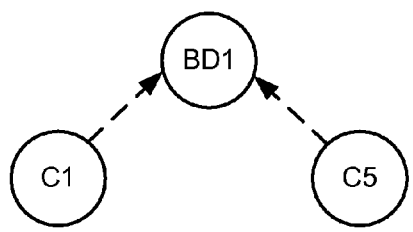

FIG. 3B shows the same credit path in a slightly different form, wherein the nonparticipating credit entities are not shown, and the credit intermediary BD1 is shown as slightly elevated above the subordinates C1 and C5. The graph shown in FIG. 3B is known as a "family tree" representation for the credit path. In this instance, BD1 would be considered to be a common parent of both C1 and C5.

Figure 4A:
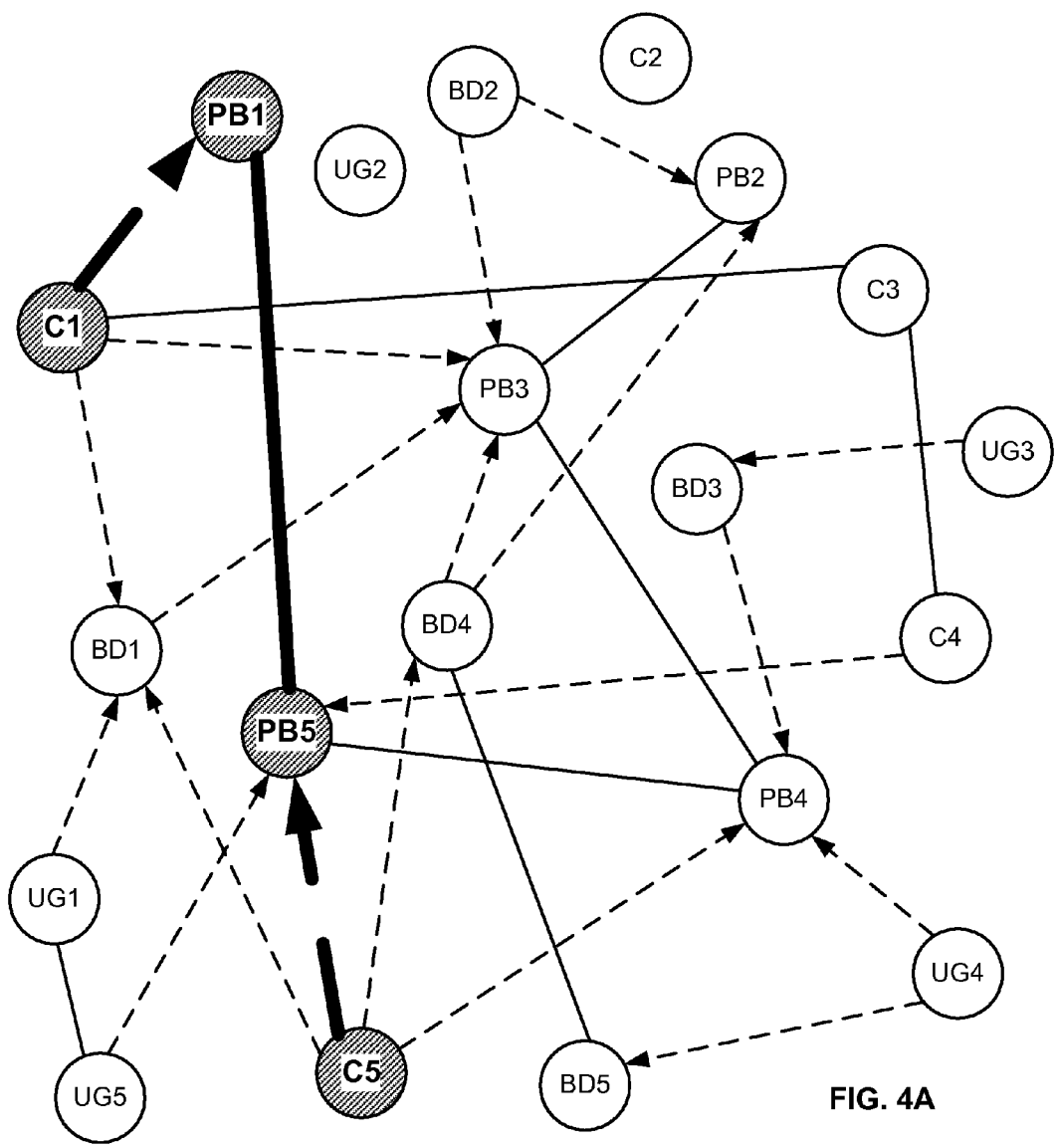
Figure 4B:
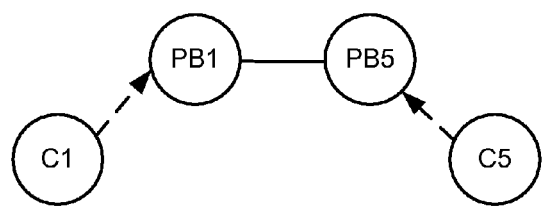

As discussed in more detail below and with reference to FIGS. 9 through 14, it may not be possible for the electronic trading system to carry out the two back-to-back trades required to use the credit path shown in FIGS. 3A and 3B because, for instance, executing one or both of the back-to-back trades would cause a credit limit exception on one or both of the two credit legs. In such a situation, computer systems configured to operate according to the present invention would select another credit path (based on the preferred counterparty rankings of the credit entities involved) and try to use the second credit path to carry out the required trades. FIGS. 4A and 4B show a second potential credit path (route) in the credit relationship network which also links credit entity C1 to credit entity C5. However; this credit path has three credit legs and passes through credit entities PB1 and PB5 instead of two credit legs which pass through credit entity BD1. To carry out a trade using this credit path, PB1 would act as a credit intermediary to C1 in a first trade corresponding to the first credit leg, PB1 and PB5 would act as peers in a direct trading relationship for a second trade corresponding to the second credit leg, and PB5 would act as a credit intermediary to C5 in a third trade corresponding to the last credit leg of the selected credit path.

FIG. 4B shows the family tree graph for the credit path illustrated by FIG. 4A. Again, the family tree graph shows the same credit path without the nonparticipating credit entities and with the credit intermediaries in a slightly elevated position relative to their subordinates. As can be seen in FIG. 4B, peers in a direct relationship are shown on the same level. In this diagram, PB1 is a "parent" of C1, C1 is a child of PB1, PB5 is a parent of C5, C5 is a child of PB5, and PB1 is a peer of PB5. Notably, if the system uses this credit path, then PB1 would be entitled to collect a brokerage fee from C1 and PB5 would be entitled to collect a brokerage fee from C5. These brokerage fees provide PB1 and PB5 with financial incentives to trade with each other even though they will not collect fees for the trade between them (because they are in a direct trading relationship). Additionally, credit entities C1 and C5 usually are willing to pay PB1 and PB5 brokerage fees because, without paying such fees to get PB1 and PB5 involved, C1 and C5 may not have available to them any other credit path capable of accommodating the order amounts in the matched pair of orders without exceeding one or more credit limits.

Figure 5A:
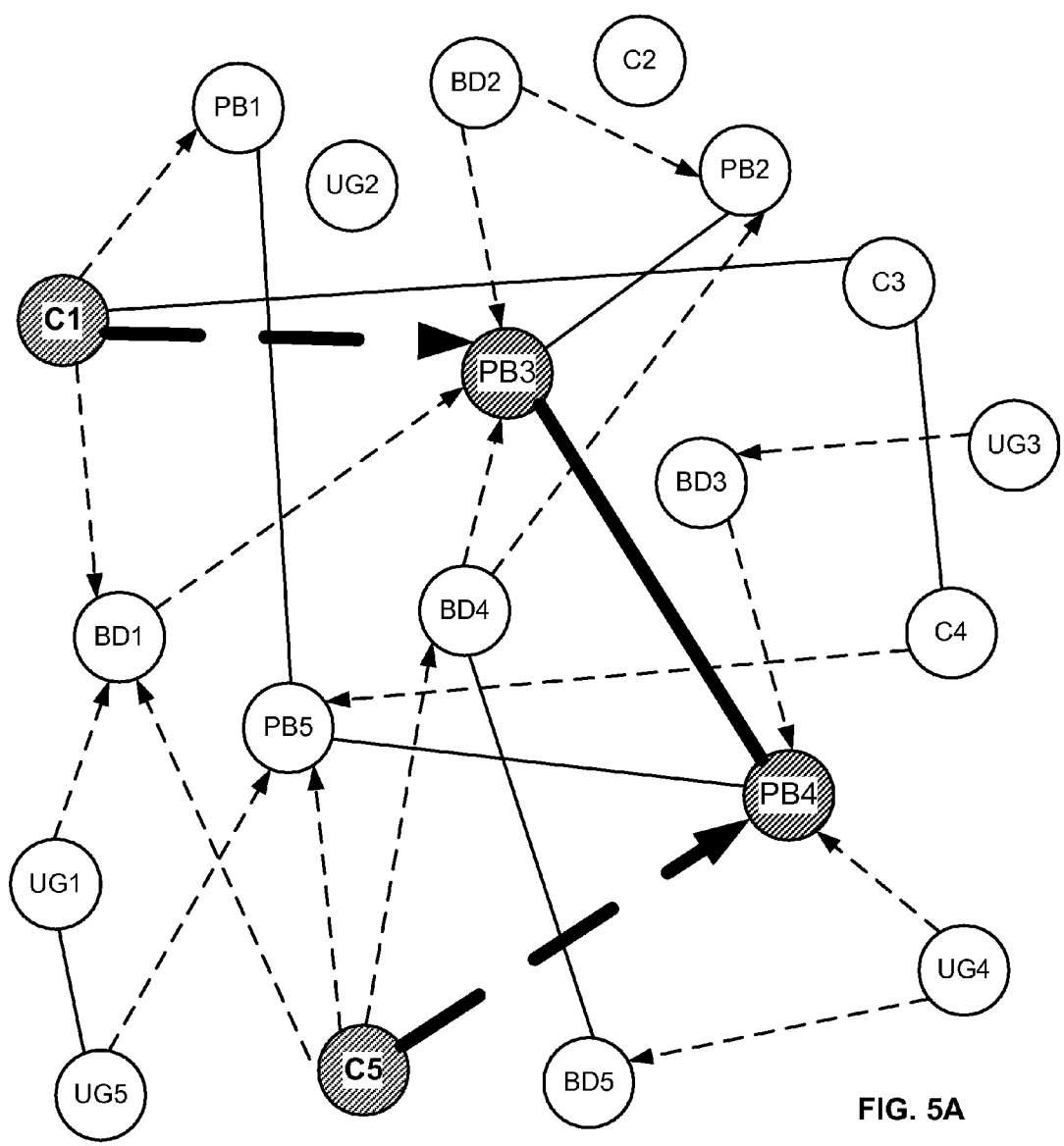
Figure 5B:
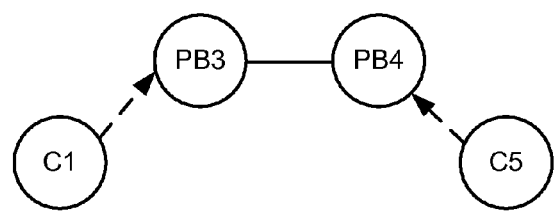

FIGS. 5A and 5B contain graphical diagrams illustrating yet a third credit path in the credit relationship network shown in FIG. 2 which could potentially be selected by a system operating according to the present invention to process a matched pair of orders submitted by credit entities C1 and C5. Like the credit path shown in FIGS. 4A and 4B, the credit path shown in FIGS. 5A and 5B comprises a total of three credit legs: two credit legs representing two credit intermediary relationships (the credit legs between C1 and PB3, and between C5 and PB4, respectively) and one credit leg representing one direct relationship (the credit leg between PB3 and PB4). In this case, PB3 would receive payment of a brokerage fee from C1, and PB4 would receive payment of a brokerage fee from C5.

Figure 6A:
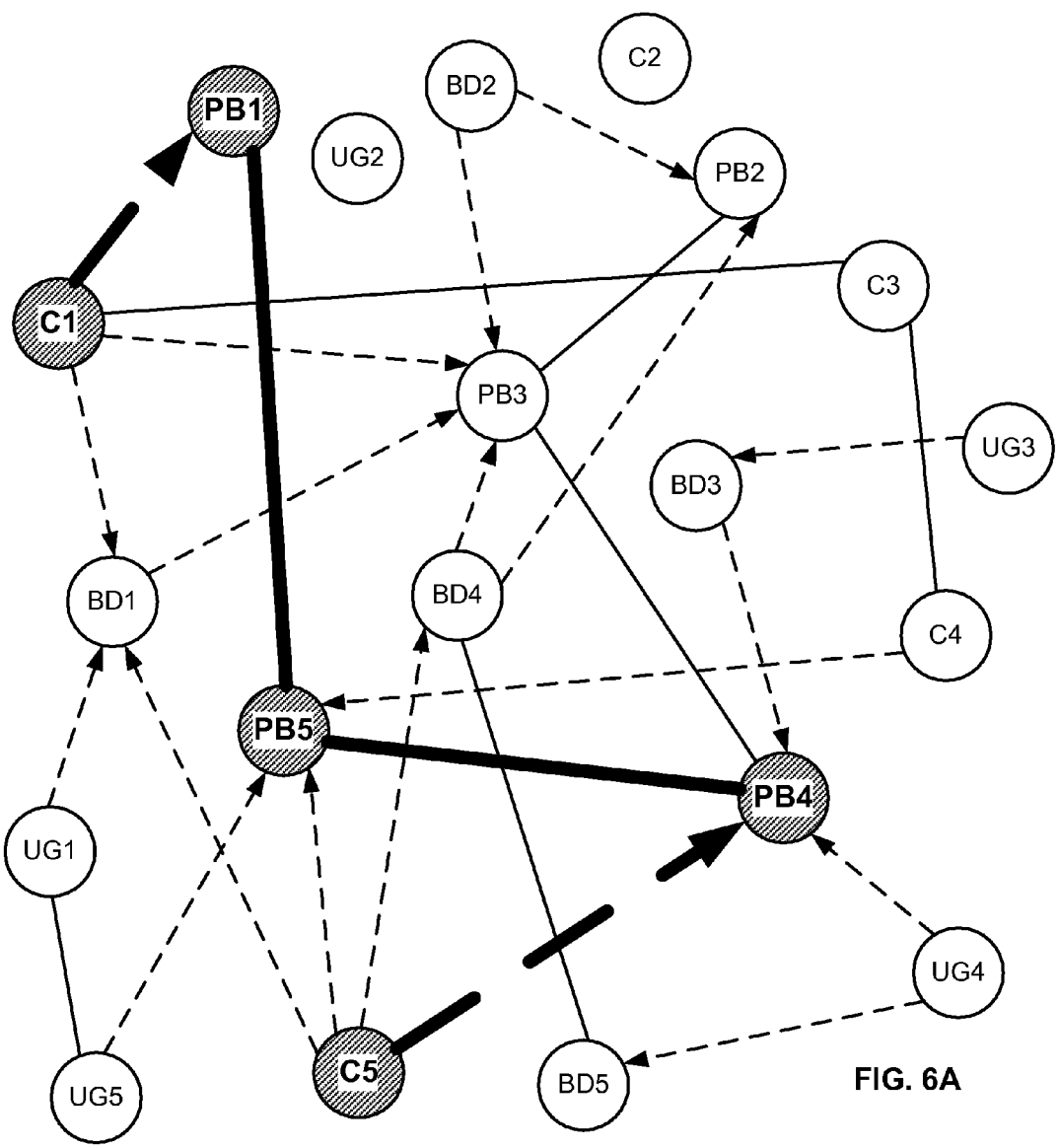
Figure 6B:
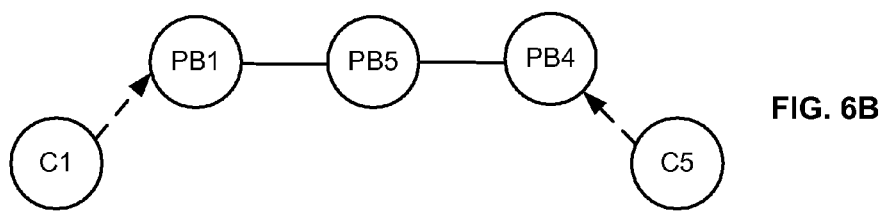

FIGS. 6A and 6B contain graphical diagrams illustrating a fourth potential credit path through the credit relationship network shown in FIG. 2 which could be selected according to the present invention to process a matched pair of orders submitted by credit entities C1 and C5. Unlike the credit paths shown in FIGS. 4A, 4B, 5A and 5B, however, the credit path shown in FIGS. 6A and 6B comprises a total of four credit legs: two credit legs representing two credit intermediary relationships (the credit legs between C1 and PB1, and between C5 and PB4, respectively) and two credit legs representing two direct relationships (the credit legs between PB1 and PB5, and between PB5 and PB4, respectively). In this situation, PB1 would collect a brokerage fee from C1, and PB4 would collect a brokerage fee from C5. However, PB5 would not collect a brokerage fee for participating in this deal because the credit legs on either side of PB5 represent direct trading relationships. In recognition of the fact that PB5 would ordinarily have no financial incentive to participate in a deal using a credit path like the one shown in FIGS. 6A and 6B (that is, a credit path comprising two direct relationship credit legs), preferred embodiments of the present invention may be configured to avoid selecting or using credit paths comprising more than one direct relationship credit leg.

Figure 7A:
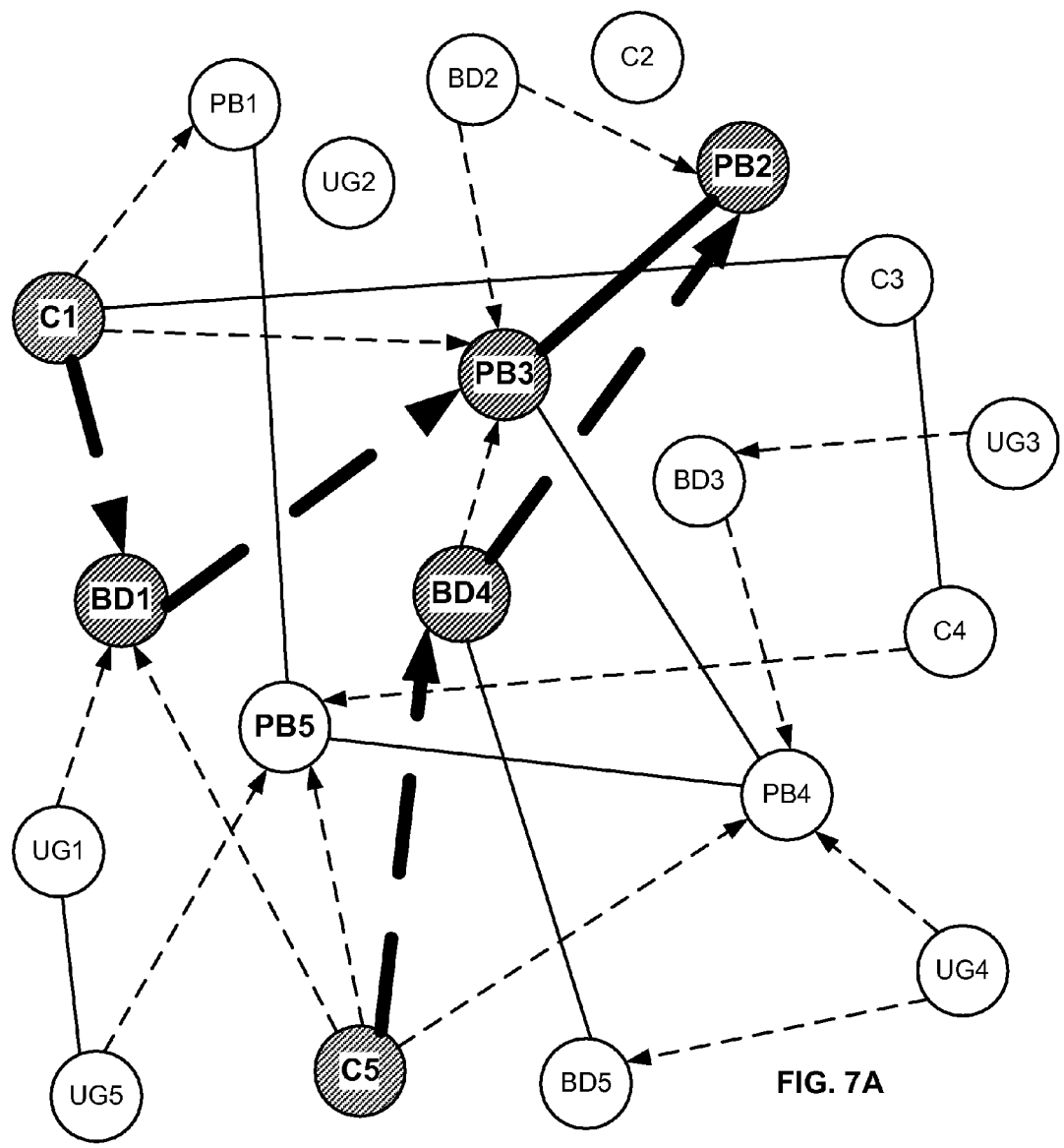
Figure 7B:
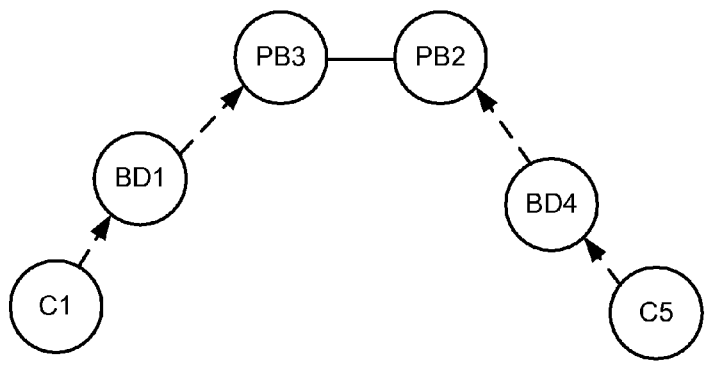

FIGS. 7A and 7B contain graphical diagrams illustrating a fifth credit path that might be selected for processing a matched pair of orders submitted by credit entities C1 and C5. In this instance, however, the credit path comprises a total of five credit legs, four of which represent credit intermediary relationships (C1 to BD1, BD1 to PB3, PB2 to BD4, and BD4 to C5), and one credit leg representing a direct relationship (PB3 to PB2). In this instance, BD1 would collect a brokerage fee from C1, PB3 would collect a brokerage fee from BD1, PB2 would collect a brokerage fee from BD4, and BD4 would collect a brokerage fee from C5. PB2 and PB3 would not collect brokerage fees from each other in this deal because they would be acting as peers in a direct relationship.

As shown in FIG. 7B, a family tree graph for the credit path represented by the graph of FIG. 7A includes two levels of credit intermediaries. In this case, BD1 would serve as both a credit intermediary (to C1) and subordinate (to PB3), while BD4 would serve as both a credit intermediary (to C5) and subordinate (to PB2). In this arrangement, PB3 would be considered to be a parent of BD1, as well as a grandparent of C1, while PB2 would be considered to be a parent of BD4, as well as a grandparent of C5. As illustrated in the example path selection algorithm depicted in FIGS. 12 and 13, discussed in more detail below, these parent and grandparent relationships may be used in embodiments of the present invention to determine and select optimal credit paths for a proposed deal when the set of potential credit paths contains only credit intermediary relationships.

Figure 8A:
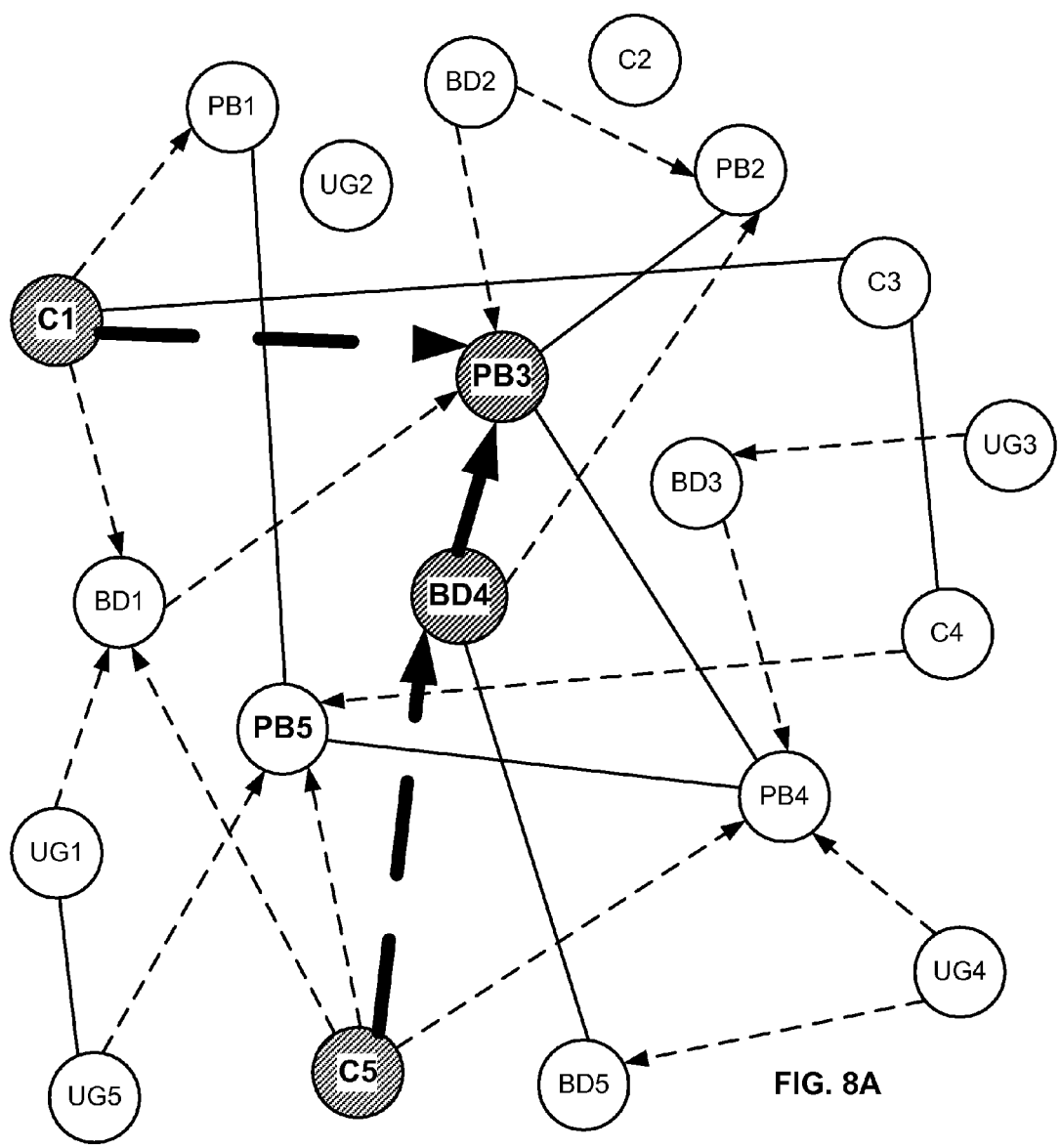
Figure 8B:
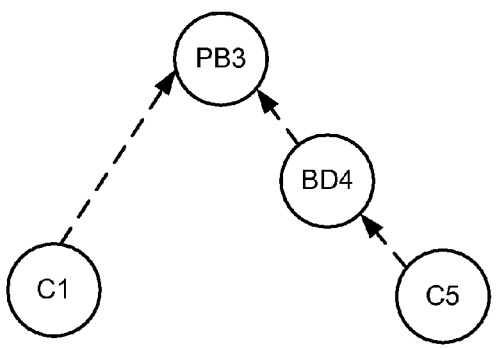

FIGS. 8A and 8B contain graphical diagrams illustrating a sixth credit path in the credit relationship network of FIG. 2, which also might be selected by a credit processing system in accordance with the present invention in order to process a deal for a matched pair of orders submitted by credit entities C1 and C5. In this instance, however, the family tree graph for the credit path (shown in FIG. 8B) is asymmetric in the sense that the common ancestor of both C1 and C5, that is PB3, is simultaneously acting as the parent of C1 and the grandparent of C5.

In a typical scenario for an electronic trading system, a matching system or engine, such as matching system 180 in FIG. 1, will receive a new order from a computer system operated by a buyer credit entity (or a seller credit entity), such as, for example, buyer credit entity computer 185 (or seller credit entity computer 190). The offer typically comprises an offer or a bid to trade a certain quantity of one currency for another. Usually, the incoming order is time stamped and then compared to one or more unmatched orders previously received by the matching system. The comparison is performed to determine if there exists a suitable match in respect to the new order's and the old order's terms, including for example, the currency to be traded, the direction of the trade, the rate and order amount. If a suitable match is not found, then the matching system will save the new order to be compared with subsequently received orders. But if the new order can be suitably matched to an old order, then the new order and the old order are linked by the matching system to form a matched pair of orders.

For purposes of the discussion which follows, the newer order in the matched pair is referred to as the "aggressor order", while the older order in the matched pair, (that is, the order that was waiting in the matching system for a suitable match the longest), is referred to as the passive order. In addition, the counterparty that submitted the aggressor order may be referred to as the aggressor counterparty, and the counterparty who submitted the passive order may be referred to as the passive counterparty. Notably, any passive order, which may comprise either an order to sell or an order to buy, was at some earlier point its lifespan, an aggressor order which the matching system failed to match with an even older passive order.

Before the electronic trading system, such as order management system 175 in this case, will be allowed to execute one or more trades required to process the matched pair of orders, the matching system must receive a confirmation from the credit data processing system that sufficient credit arrangements (i.e., credit lines) exist in the credit relationship network to accommodate the trades. For example, if the aggressor order was submitted by a credit entity that, because of earlier-executed but as yet unsettled trades, has exhausted all of its credit with all of its preferred counterparties, or simply does not have sufficient credit available on any credit path linking the aggressor credit entity to the passive credit entity, then the trades that would have to be executed to fill the aggressor order should be rejected. Accordingly, the matching system sends a request to the credit data processing system to confirm that sufficient credit arrangements exist to accommodate a deal between the credit entity that submitted the aggressor order and the credit entity that submitted the passive order.

General Overview of Path Selection Process

A detailed discussion of the steps performed by a credit data processing system configured to operate according to one embodiment of the present invention is presented below with reference to FIGS. 9 through 15. To aid understanding of the detailed discussion, however, a more general overview of the credit path selection and limit checking processes will be presented first.

When the credit data processor system receives a request to confirm sufficient credit arrangements from the electronic trading system, it first determines the set of potential credit paths in the credit relationship network that exist between the owner of the aggressor order (the aggressor counterparty) and the owner of the passive order (the passive counterparty) which might be used to effect the trade. Initially, the set of potential credit paths will be all of the credit paths that exist between the aggressor counterparty and the passive counterparty. If there is only one potential credit path that can be used to effect a trade between the aggressor counterparty and the passive counterparty, and if effecting the trade using that one credit path will not cause any credit limit exceptions on any credit leg in the credit path, then the credit data processing system will send to the electronic trading system a credit confirmation notice and the details for that single available credit path.

On the other hand, if there are multiple potential credit paths that could be used to effect the trade, as shown, for example, in FIGS. 3A through 8B, discussed above, then the credit data processor will run those multiple credit paths through a series of filters to select an optimal credit path based on the preferred counterparty rankings provided by the credit entities associated with the aggressor counterparty, the passive counterparty, and the intermediate counterparties associated with the multiple potential credit paths. If at any point during the filtering process there remains only one credit path in the set of potential credit paths as the result of a filter, then that single credit path will be selected as the optimal credit path and no further filtering is required. Information about the selected optimal credit path will then be sent to a limit checking routine or object-oriented programming method to determine whether any credit limits on any of the credit legs in the selected optimal credit path would be exceeded by any of the trades required to effect the overall trade.

If the credit limit check for the selected optimal credit path fails, then the credit data processor will delete the failed credit path from the set of potential credit paths, as well as every other credit path that contains the credit leg that failed. Having reduced the number of members in the set of potential credit paths in this fashion, the credit data processor will then find in the reduced set the most optimal credit path remaining (again based on the preferred counterparty rankings of the counterparties in each path) and run the credit limit checking routine or method against that credit path. The credit data processor will continue to select and credit limit check credit paths in the set of potential credit paths until the credit limit check succeeds or every credit path in the set of potential credit paths has been eliminated, or tried and failed. Thus, the credit data processing system will return to the electronic trading system either a confirmation of sufficient credit (along with the details for the selected optimal credit path) or a credit failure notice (optionally including details about the credit legs and/or counterparties which caused the failure).

The optimal credit path in a set of multiple potential credit paths is determined according to the preferred counterparty rankings supplied by the aggressor and passive counterparties. In a preferred embodiment, the preferred counterparty rankings for the aggressive counterparty are given priority over the preferred counterparty rankings of the passive counterparty, and direct trades are given priority over trades involving credit intermediaries. Thus, if there are multiple credit paths in the set of potential credit paths, then the credit data processor will first reduce the set of potential credit paths so that it includes only the credit paths that use the aggressor counterparty's highest preferred counterparty. In other words, the first step will be to remove from the set of potential credit paths all of the potential credit paths that do not pass through the aggressor counterparty's highest ranked preferred counterparty. Next, if any of the remaining credit paths has a subsequent credit leg that represents a direct relationship, then the set of potential credit paths will be reduced again so that it includes only those credit paths that have as its subsequent credit leg a credit leg that represents a direct relationship. If there are multiple credit paths available after taking into consideration the preferences of the entities on aggressive side of the direct trade, the preferences of the entities on the passive side of the direct trade will be used. If, however, none of the credit paths remaining in the set of potential credit paths has a subsequent credit leg representing a direct relationship, then the next credit intermediary selected for the optimal path will be the highest ranked preferred counterparty of the aggressor counterparty. If there are multiple credit paths available after selecting the highest ranked credit intermediary of the aggressor counterparty, then the credit paths using the highest ranked preferred credit intermediary for the passive counterparty will be selected.

When an optimal credit path has been selected, the credit data processor will next perform a credit limit check on the optimal credit path to determine whether there is sufficient credit available on every credit leg in the selected optimal path to permit every intermediate trade required to carry out the overall trade. The credit limit check on the selected optimal credit leg will fail if executing any one of the intermediate trades would cause a credit limit exception on the credit leg corresponding to that intermediate trade. A credit limit exception occurs if the sum of the current net open position for the credit leg and the amount of the order exceeds the credit limit the credit maker has specified for the credit taker on the credit leg.

Figure 9:
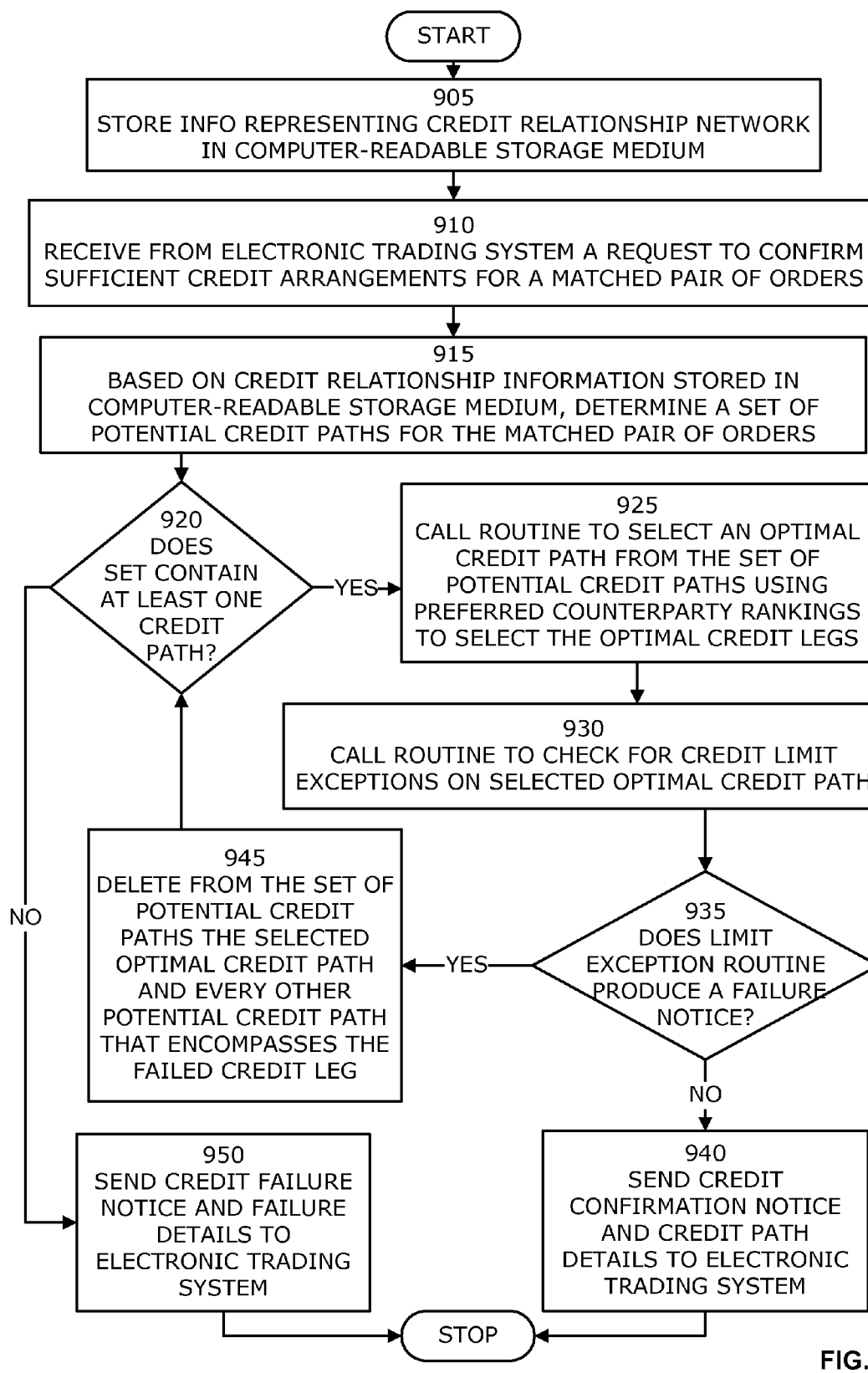
FIGS. 9 through 14 contain exemplary high-level flow diagrams illustrating the steps that may be performed by various components of the invention to identify, select and credit check optimal credit paths in a credit relationship network.

FIGS. 9 through 14 contain flow diagrams illustrating in more detail the steps generally described above for selecting and checking the limits on optimal credit paths in a credit relationship network according to embodiments of the invention. FIG. 9 shows at a high level the overall process, which calls one routine to select the optimal credit path (using the steps shown in FIGS. 10 through 13) and another routine to perform the credit limit check against the credit legs in the selected optimal path (using the steps shown in FIG. 14).

As shown in FIG. 9, at step 905, the system first stores in a computer-readable storage medium (such as a hard drive), information representing the details of a credit relationship network, including credit entities, credit relationships between and among at least some of the credit entities, preferred counterparty rankings for the credit entities and net open positions associated with the credit relationships. Typically, this step is carried out by a credit administrator module configured to receive and store credit data supplied by credit entities via a connection between the credit data processing system and the computers operated by those credit entities. Some of the credit data may also be supplied by a centralized credit administrator charged with setting up credit accounts on behalf of the credit entities participating in the credit relationship network. Some of the credit data stored in the storage medium, particularly the credit data pertaining to current net open positions, may be produced and periodically updated by a program or processor, such as position manager 155 in FIG. 1, running on the credit data processing system, configured to monitor, manage and update this information. In response to receiving the credit data, the system may be configured, for example, to create and store in the computer-readable storage medium computer-readable versions of relationship tables similar to Table 1 and Table 2, discussed above.

Next, at step 910, the system receives a request to confirm sufficient credit arrangements for processing a matched pair of orders. Based on the credit relationship information stored in the computer-readable storage medium at step 905, the system determines the set of credit paths (i.e., routes) existing in the credit relationship networks which might be used to effect a trade between the two parties responsible for submitting the orders in the matched pair of orders. For example, if the credit relationship network comprises the credit entities and relationships shown in FIG. 2, discussed above, and the matched pair of orders comprises orders submitted by credit entities C1 and C5, then the system would automatically identify at least all of the potential credit paths shown in FIGS. 3A through 8B. The system may be configured to identify the members of the set of potential credit paths, for example, by retrieving from the storage medium computer-readable version of relationship tables like Table 1 and Table 2, above.

If the set of potential credit paths does not contain at least one credit path (as would be the case, for example, if the aggressor or passive order owner was C2 or UG2 in FIG. 2), then the system would send to the calling program or system a credit failure notice (steps 920 and 950). Preferably, the credit failure notice would contain sufficient failure details and/or warnings so that the calling program (and ultimately, the parties or systems who invoked the calling programs) will be able to tell why the order was rejected and, if possible, address the cause for the credit failure so that future orders will not be rejected for the same reason. On the other hand, if the set of potential credit paths includes at least one credit path, then the system calls a routine to select an optimal credit path from the set of potential credit paths using the preferred counterparty rankings specified by the credit entities involved to select the optimal credit path's credit legs (step 930). FIGS. 10 through 13, which are discussed in more detail below, contain flow diagrams illustrating by way of example steps such a routine may perform in order to carry out selecting an optimal credit path.

After an optimal credit path is selected from the set of potential credit paths, the system next calls a routine to check for credit limit exceptions on the selected optimal credit path (step 930). FIG. 14, discussed in more detail below, contains a flow diagram illustrating by way of example, the steps such a routine may perform in order to carry out checking for credit limit exceptions on the selected optimal credit path. If the limit exception routine does not return a failure notice, then every credit leg in selected optimal credit path has passed the credit limit check, and a credit confirmation notice containing the details of the selected and verified optimal credit path will be sent to the calling program or system (steps 935 and 940). On the other hand, if the limit exception routine produces a failure notice, then the system will delete the selected optimal credit path from the set of potential credit paths along with every other potential credit path containing the credit leg that failed the credit limit check (step 945).

Next, processing returns again to step 920, where the system will again check the set of potential credit paths to see if it contains at least one potential credit path. If not, then the system will return a credit failure notice indicating that no credit paths capable of handling the order amount for the matched pair exists. But if the set of potential credit paths still contains at least one potential credit path, then the routines for selecting and credit limit checking an optimal credit path will be performed for a second time. This overall process will repeat itself until either a credit confirmation is sent, or every credit path in the set of potential credit paths has been tried and failed, or otherwise eliminated because it contained a credit leg that failed a credit limit check associated with another failed potential credit path.

Figure 10:
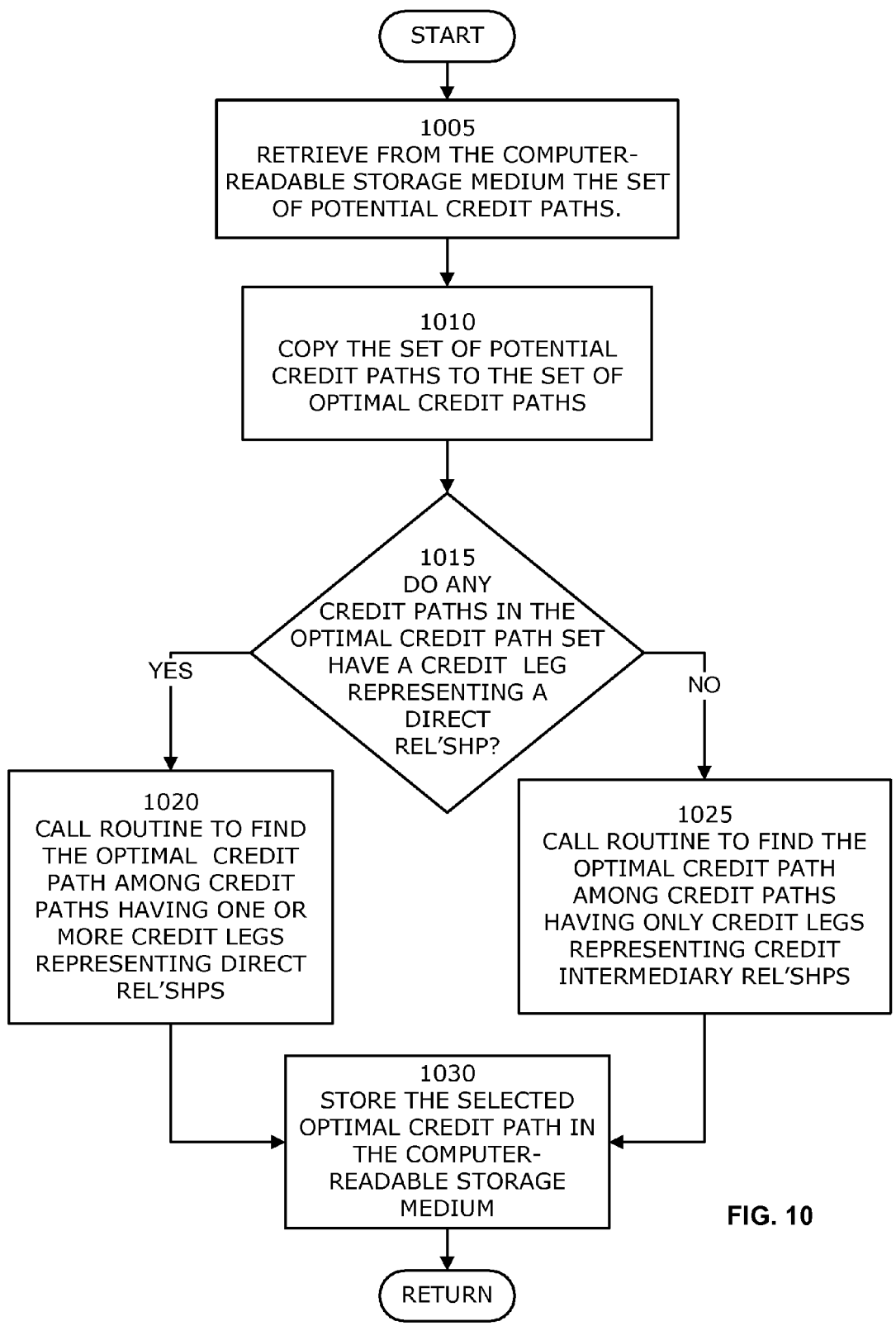

FIG. 10 contains a high-level flow diagram illustrating by way of example steps that may be performed by embodiments of the invention to select an optimal credit path from a set of potential credit paths. First, at step 1005, the system retrieves from the computer-readable storage medium the set of potential credit paths. Next, at step 1010, the system copies the set of potential credit paths to another location in the storage medium, specifically, a location in memory referred to as the set of optimal credit paths. As will be explained below with reference to FIGS. 11 through 13, subsequent steps will require filtering (i.e., deleting) credit paths from the set of optimal credit paths until only one optimal credit path remains. But if that one remaining optimal credit path fails a limit check (performed at step 930 of FIG. 9), and therefore gets deleted from the set of potential credit paths by step 945 in FIG. 9, then steps 1005 and 1010 permit the system to retrieve again all of the potential credit paths for the matched pair except for the potential credit paths that failed the credit limit check and/or were deleted by step 945.

As previously stated, preferred embodiments of the invention give priority to credit paths containing credit legs that represent direct relationships, as these credit paths usually involve fewer credit intermediaries and fewer brokerage fees. Therefore, at step 1015, the system determines whether any credit paths in the set of optimal credit paths contain a credit leg that represents a direct relationship. If so, then the system calls a routine, at step 1020, which is configured to find the optimal credit path among credit paths having one or more credit legs representing direct relationships. If not, then the system calls a different routine, at step 1025, configured to find the optimal credit path among credit paths having only credit legs representing credit intermediary relationships. Finally, at step 1030, the optimal credit path selected by either one of the path selection routines called in steps 1020 and 1025 are stored in the computer-readable storage medium.

Figure 11:
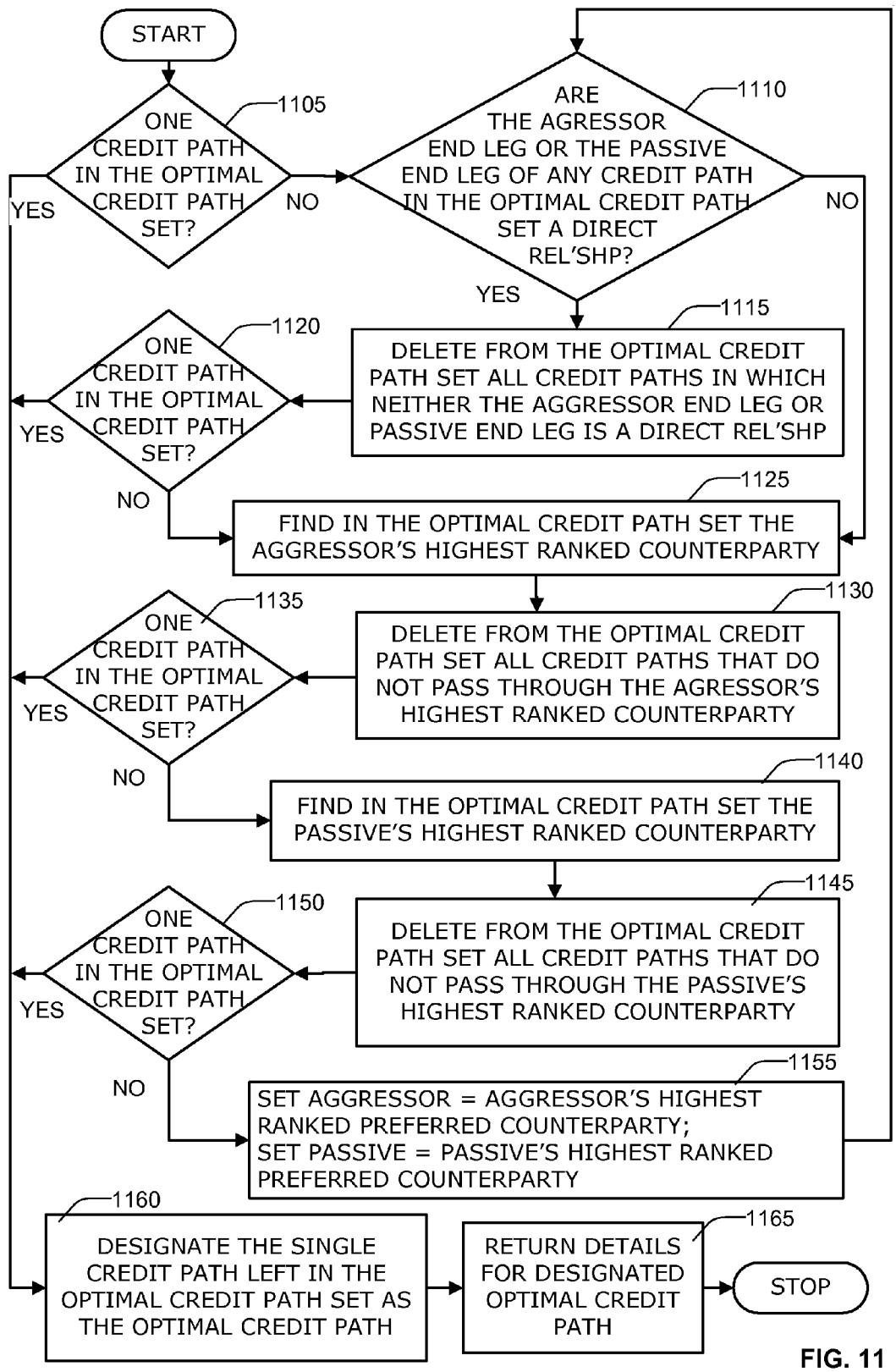

FIG. 11 contains a flow diagram that illustrates by way of example steps that may be performed by some embodiments of the invention to determine the optimal credit path among one or more credit paths containing at least one credit leg representing a direct relationship. First, at step 1105, the system determines whether the set of optimal credit paths contains only one credit path as a result of deletions performed in previous passes through these path selection and limit checking routines. If so, then the single credit path left in the set of optimal credit paths is designated as "the" optimal credit path and processing returns to the calling program or method (see steps 1160 and 1165). Otherwise, the system next looks at the end legs of the credit paths in the set of optimal credit paths (i.e., the legs that include the credit entities that submitted the aggressor and passive orders) and determines whether either of these end credit legs represents a direct relationship (step 1110). If the answer is yes, then the set of optimal credit paths is filtered by deleting all credit paths in which neither the aggressor end leg or passive end leg represents a direct relationship. The system then checks again to determine whether this deletion caused the set of optimal credit paths to be trimmed to only one credit path (step 1120), in which case control will pass again to steps 1160 and 1165, where the single remaining credit path will be designated as "the" optimal credit path.

If it is determined at step 1110 that neither end credit leg represents a direct relationship, or at step 1120 that more than one credit path remains in the set of optimal credit paths, then the system next finds in the set of optimal credit paths the aggressor credit entity's highest ranked counterparty and deletes from the set of optimal credit paths all credit paths that do not pass through that highest ranked counterparty (steps 1125 and 1130). If this deletion causes the set of optimal credit paths to be trimmed to only one credit path, then, once again, control will pass to steps 1160 and 1165, where the single remaining credit path will be designated as "the" optimal credit path (see step 1135). Otherwise, the system next finds in the set of optimal credit paths the passive credit entity's highest ranked counterparty and deletes from the set of optimal credit paths all credit paths that do not pass through that highest ranked counterparty (steps 1140 and 1145). If this deletion causes the set of optimal credit paths to be trimmed to only one credit path, then, once again, control will pass to steps 1160 and 1165, where the single remaining credit path will be designated as "the" optimal credit path (see step 1150). But if there still remains more than one credit path in the set of optimal credit paths, then the system will effectively move the aggressor and passive labels toward each other in all of the remaining credit paths (up a level in their respective family trees) so that they point to the previously used highest ranked counterparties (step 1155). Then the system will pass control back to step 1110, where the process starts all over again using the newly assigned aggressor and passive parties as a starting point. By moving the aggressor and passive labels to the previously used highest ranked counterparties, the system effectively repeats the steps in the credit path selection process (steps 1110 through 1150) while ignoring the previous two end credit legs.

Figure 12:
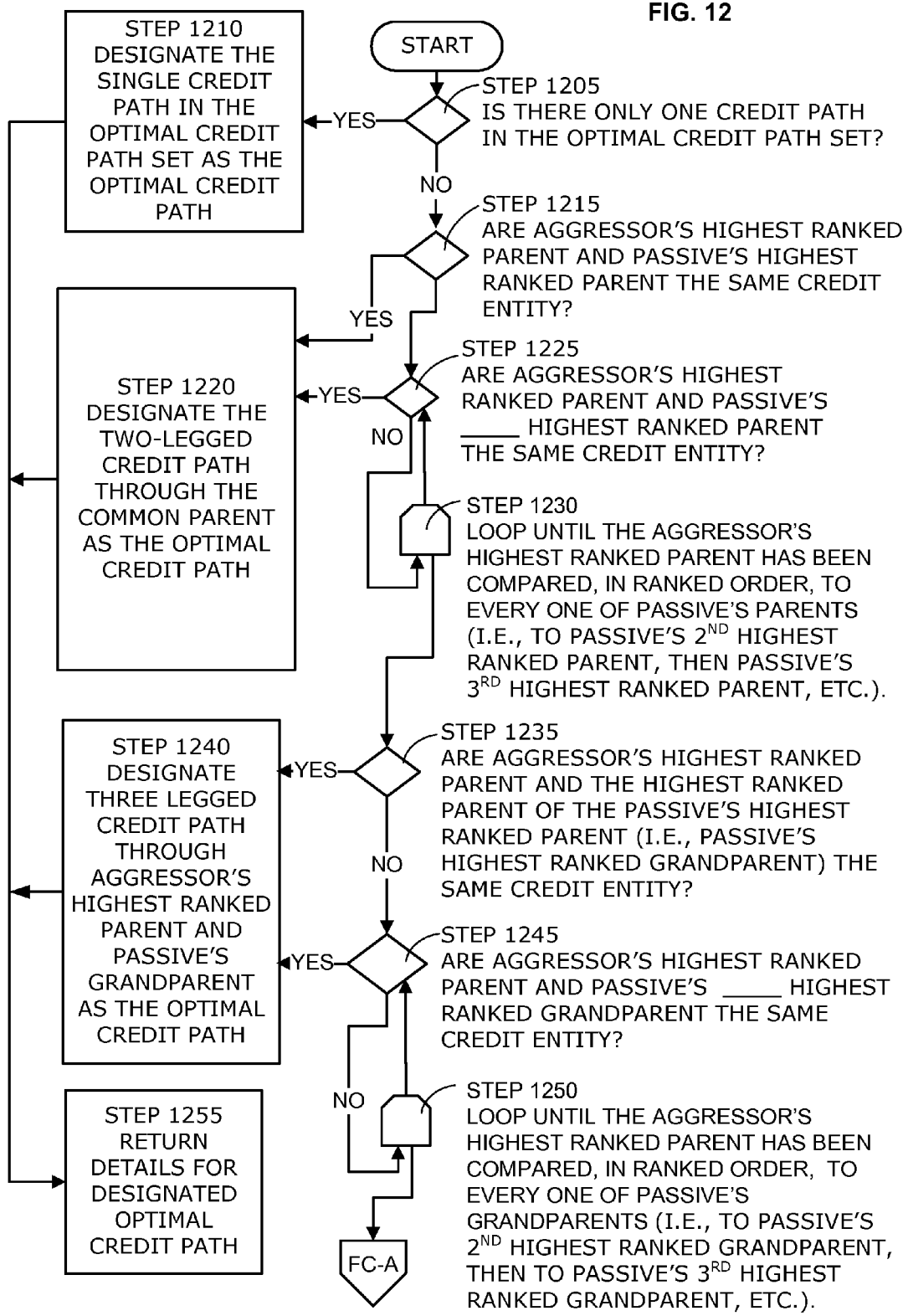

FIG. 12 contains a flow diagram illustrating by way of example the steps that might be performed by a computer system or program to select an optimal path from among credit paths containing only credit legs representing credit intermediary relationships. As shown in FIG. 12, the system first determines, at step 1205, whether there is only one credit path in the set of optimal credit paths. If so, then the system designates the single credit path as "the" optimal credit path and returns the details of the designated optimal credit path to the calling program or system (see steps 1210 and 1255). If there is more than one credit path in the set of optimal credit paths, then the system determines, at step 1215, whether the aggressor's highest ranked parent (credit intermediary) and the passive's highest ranked parent are the same credit entity. In other words, the system determines in step 1215 if the family tree diagram for the aggressor and passive counterparties looks like the family tree diagram shown in FIG. 3B, discussed above, wherein credit entity C1 and credit entity C5 have a common parent BD1. If the aggressor and passive credit entities have a common parent, who also happens to be both the aggressor's and the passive's highest ranked preferred counterparty, then the two legged credit path passing through the common parent will be designated as "the" optimal credit path (step 1220). If the aggressor's highest ranked parent and the passive's highest ranked parent are not the same credit entity, then the aggressor's highest ranked parent will be compared to the passive's second highest ranked parent, followed by passive's third highest ranked parent, followed by passive's fourth highest ranked parent, and so on, until a common parent is found or every one of passive's parents, in the order of their ranks, has been compared to aggressor's highest ranked parent (steps 1225 and 1230). If a common parent is found, the two-legged credit path passing through the common parent is designated as "the" optimal credit path and the details for the designated optimal credit path are returned to the calling program or system (steps 1220 and 1255).

Using these steps, the system could determine, for example, that the optimal credit path for the matched pair of orders submitted by the aggressor credit entity and the passive credit entity comprises the path that passes from the aggressor credit entity to the aggressor credit entity's highest ranked parent, then to the passive credit entity's fourth highest ranked parent, and then to the passive credit entity. Thus, it can be seen that using these particular steps in the particular order herein described would give priority to the preferred counterparty rankings expressed by the aggressor credit entity. However, it is noted that the steps and processes described herein may easily be modified to give priority to the passive's credit entity's preferred counterparty rankings without departing from the spirit and scope of the claimed invention.

If a common parent is not found, the system next determines whether aggressor's highest ranked parent happens to be a grandparent of the passive counterparty. The family tree diagram for such a credit path would look like the family tree diagram shown in FIG. 8B, discussed above. Accordingly, at steps 1235, 1245 and 1250, the aggressor's highest ranked parent will be successively compared to the highest ranked parent of passive's highest ranked parent (i.e., passive's highest ranked grandparent), then to passive's second highest ranked grandparent, then to passive's third highest ranked grandparent, and so on, until a common ancestor is found or until the passive counterparty has no more grandparents to compare. If one of passive's grandparents is found to be the same credit entity as aggressor's highest ranked parent, then the three-legged credit path passing through aggressor's highest ranked parent (who happens to be a grandparent of the passive counterparty) is selected as "the" optimal credit path (step 1240).

Figure 13:
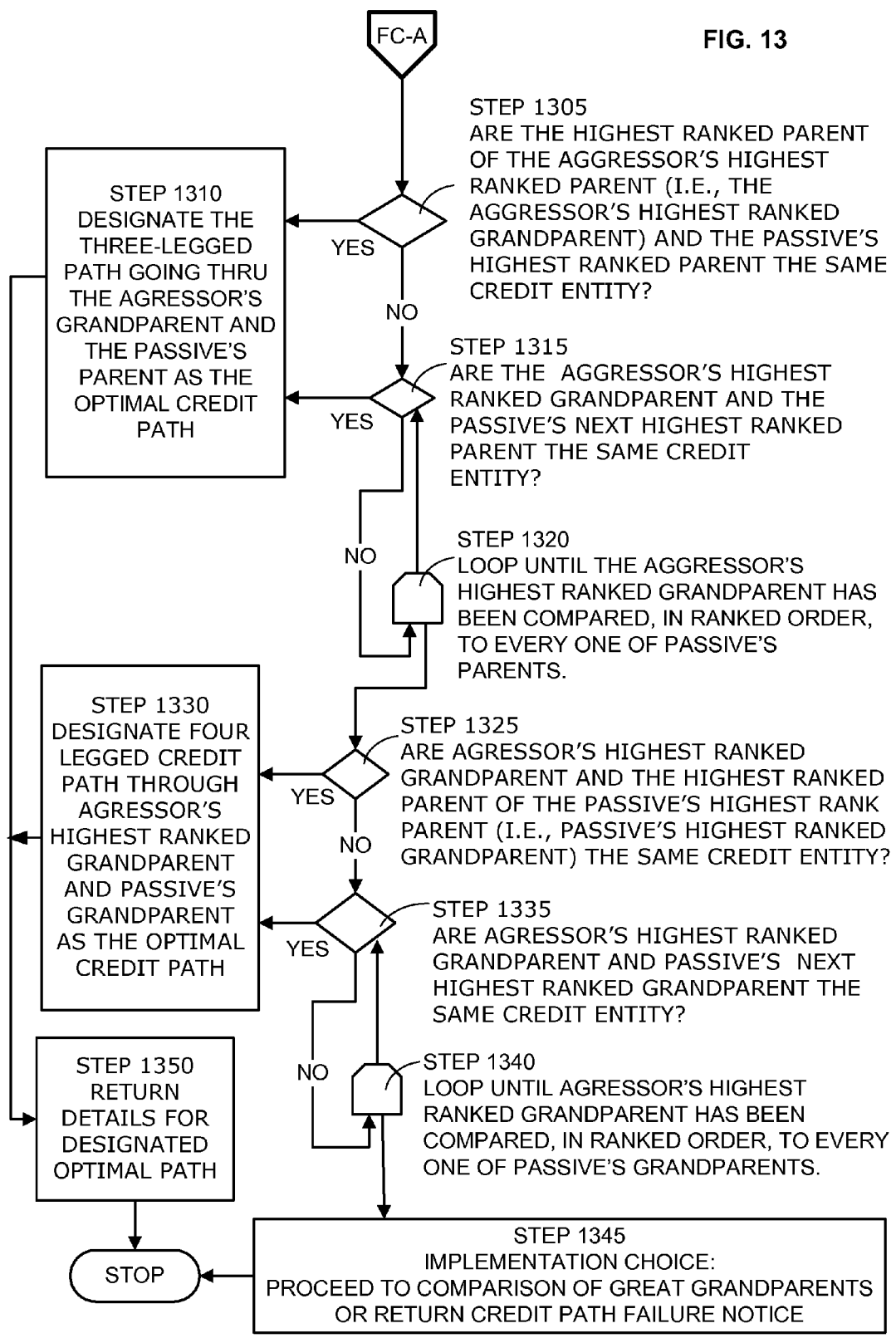

On the other hand, if none of passive's grandparents are found to be the same credit entity as aggressor's highest ranked parent, then control passes to step 1305 of FIG. 13 by way of flow chart connector FC-A, whereupon the aggressor's highest ranked grandparent is successively compared to passive's first highest ranked parent, followed by passive's second highest ranked parent, followed by passive's third highest ranked parent, and so on, to see if they are the same credit entity (steps 1305, 1315 and 1320). If so, then the three-legged credit path passing through aggressor's highest ranked grandparent and passive's parent is designated as "the" optimal credit path (step 1310) and details for the designated optimal credit path are returned to the calling program or system (step 1350). But if not, then the highest ranked parent of aggressor's highest ranked parent (i.e., aggressor's highest ranked grandparent) is successively compared to the highest ranked parent of passive's first highest ranked parent (i.e., passive's highest ranked grandparent), passive's second highest ranked grandparent, passive's third highest ranked grandparent, and so on, to determine whether aggressor's highest ranked grandparent and one of passive's grandparents are the same credit entity (steps 1325, 1335 and 1340). If they are the same, then the four-legged credit path passing through aggressor's highest ranked grandparent and passive's grandparent is designated as "the" optimal credit path (step 1330) and the details of the designated optimal credit path are returned to the calling program or system (step 1350) for further processing.

Finally, at step 1345, if no common ancestors have been found after comparing all of passive's grandparents to aggressor's highest ranked grandparent, operators of credit data processing systems according to the present invention may choose to return a credit path failure notice, or alternatively, proceed to comparing aggressor's grandparents to passive's great grandparents. Whether the system returns a credit path failure notice or continues looking for a common ancestor at this point is a matter of implementation choice. However, both possibilities would fall within the scope and spirit of the present invention.

FIG. 14 shows a high-level flow diagram illustrating steps that could be performed by systems operating according to the principles of the present invention in order to perform a credit limit check against a selected optimal path. As shown in FIG. 14, the first step is to retrieve the selected optimal credit path from the computer-readable storage medium (step 1405). Next, at step 1410, the system sets the current credit leg (which is basically a pointer) to the first credit leg in the selected credit path. It does not matter whether the first credit leg is adjacent to the aggressor credit entity or the passive credit entity, since all credit legs will be checked until a credit failure is found. Next, at steps 1415, and 1420, the system retrieves from the storage medium the credit limit specified by the credit maker for the credit taker on the current credit leg, and the net open position for the credit maker and the credit taker associated with the current credit leg. If it is determined, at step 1425, that the sum of the order amount for the matched pair of orders and the net open position for the current credit leg exceeds the credit limit for that credit leg, then a credit failure notice, including information about the failed credit leg, is returned to the calling program or system (step 1430). On the other hand, if the sum of the order amount and the net open position does not exceed the credit limit for the current credit leg, then the system determines if there are any more untested credit legs in the selected optimal credit path (step 1435). If the answer is yes, then the current credit leg pointer is moved to the next credit leg in the selected credit path (see step 1440), and control passes again to step 1415 and 1420, where the credit limit and the net open position for the new current credit leg are retrieved in preparation for another comparison with the order amount. However, if it is determined at step 1435 that all credit legs in the selected optimal path have been tested, then a credit check passed notice will be returned to the calling program or system (step 1445).

FIG. 15 contains a flow diagram illustrating the steps that may be performed, for example, by position manager 155 of FIG. 1, in order to calculate a new aggregate net open position for a credit leg subsequent to a limit checking operation like the one described above with reference to FIG. 14. As shown in FIG. 15, the new aggregate net open position for a credit leg after a credit check may be calculated as follows:

First, the system calculates the net buy and sell positions, respectively, for each currency in the matched pair by adding the bought currency for the matched pair to the previous bought currency net position and subtracting the sold currency for the matched pair from previous sold currency net position (step 1505). Typically, the previous bought currency net positions and the previous sold currency net positions were calculated and stored in memory contemporaneous with the previous credit authorization for the credit leg. Next, at step 1515, for each single net currency position, the system calculates a corresponding USD value (or a corresponding EUR value, according to the option selected by the credit maker in the credit administrator module 145) based on a specified exchange rate. The system then sums all resulting long USD (or EUR) values to generate the long current usage net open position for that credit leg (step 1525). Then, the short current usage net open position for that credit leg is calculated by finding the absolute value of the sum of all resulting short USD (or EUR) values (step 1535). The new aggregate net open position for that credit leg is set to the greater of the summed long and short positions (step 1545).

Credit Data Processing System Interface

Using the object-oriented programming model, the interface for a credit data processing system according to one embodiment of the invention may be defined as follows:

The register( ) method, shown below, registers a listener for events relating to credit relationships (i.e., credit paths). Events are typically generated for credit relationship modifications. For example, the graphical user interfaces coupled to the credit administration module 145, which displays credit relationship details to credit entities, may need to be updated when credit relationship attributes change.

```
/**
 * listen for changes to credit positions
 * @param source "Application#1", "Application#2",
   "Matching System", etc
 * @param initialLeaseDuration the number of milliseconds that the initial lease will last for
 * @param listener not currently used
 * @return lease associated with this registration. This lease
   should be periodically used
 * @throws RemoteException
 */
Lease register(String source, long initialLeaseDuration,
   RemoteEventListener listener) throws RemoteException;
```

The check( ) method, shown below, performs a check to see if a match between two counter parties would be possible. This entails finding a credit path between the two counter parties and possibly doing additional checks on the order attributes. The version of this method that takes two arguments only checks for existence of a credit path. The other variation of this method tests for existence of a credit path as well as available credit on those lines. This method does not reserve the credit against the credit relationships. In order to improve performance of the overall system, this method may be implemented within a proxy running on the local machine where the calling application is running

```
/**
 * Check that two counterparties have a credit path. Does
   not check
 * credit relationship limits.
 * @param aggressiveCpty counterparty for the aggressive
   order
 * @param passiveCpty counterparty for the passive order
 * @throws RemoteException
 * @throws CreditException if there is an error involving
   one or both of the counterparties credit
 */
void check(CreditEntity aggressiveCpty, CreditEntity passiveCpty) throws RemoteException, CreditException;
/**
 * Check that two counterparties have credit available for
   trading
 * @param aggressiveCpty counterparty for the aggressive
   order
 * @param passiveCpty counterparty for the passive order
 * @param buyCcy the currency which is being bought
 * @param buyAmount the amount of currency which is
   being bought
 * @param sellCcy the currency that is being sold
 * @param sellAmount the amount of the currency which is
   being sold
 * @param dealType spot=0
 * @param near near date.
 * @param far far date. This is null for a spot trade
 * @throws RemoteException
 * @throws CreditException if there is an error involving
   one or both of the counterparties credit
 */
void check(CreditEntity aggressiveCpty, CreditEntity passiveCpty, String buyCcy, BigDecimal buyAmount, String
   sellCcy, BigDecimal sellAmount, int dealType, Calendar
   near, Calendar far) throws RemoteException, CreditException;
```

The authorize( ) method, shown below, selects an optimal credit path between the two counter parties and performs a check on the selected optimal credit path to see if processing a matched pair of orders would be allowable given the current credit limits. This method also will temporarily book the order amount against each credit leg in the selected credit path. This entails checking the net open position (NOP) to verify that enough credit exists for the trade to be booked. If multiple credit pathways are found, then the preferred credit intermediary list is used to identify the preferred credit path. To improve performance, this step may be performed against a cache memory area that is local to the proxy. This method temporarily reserves the credit against the credit relationships in the credit path. The return value from this method is a transaction instance that needs to be committed or rolled back by the caller. It is important to note that although the return object implements the transaction interface, it does not, in preferred embodiments, lock or synchronize the credit relationships according to the proposed trade. Thus, the caller will subsequently need to invoke another method to commit the order amount to the credit relationships, or otherwise abort the reservation on this object depending upon other conditions.

```
/**
 * authorize credit between two counterparties
 * @param aggressiveCpty counterparty for the aggressive
   order
 * @param passiveCpty counterparty for the passive order
 * @param buyCcy the currency which is being bought
 * @param buyAmount the amount of currency which is
   being bought
 * @param sellCcy the currency that is being sold
 * @param sellAmount the amount of the currency which is
   being sold
 * @param dealType spot=0
 * @param near near date.
 * @param far far date. This is null for a spot trade
 * @throws RemoteException
 * @throws CreditException if there is an error involving
   one or both the counterparties credit
 * @param leaseTime the initial reservation time. This
   should be set to the maximum expected time for the trade
   to take place
 * @return the credit reservation
 * @throws RemoteException
 * @throws CreditException
 */
Reserved authorize(CreditEntity aggressiveCpty, CreditEntity passiveCpty, String aggressiveOrderId, String passiveOrderId, String buyCcy, BigDecimal buyAmount, String sellCcy, BigDecimal sellAmount, int dealType, Calendar near, Calendar far, long leaseTime) throws RemoteException, CreditException;
```

Figure 16:
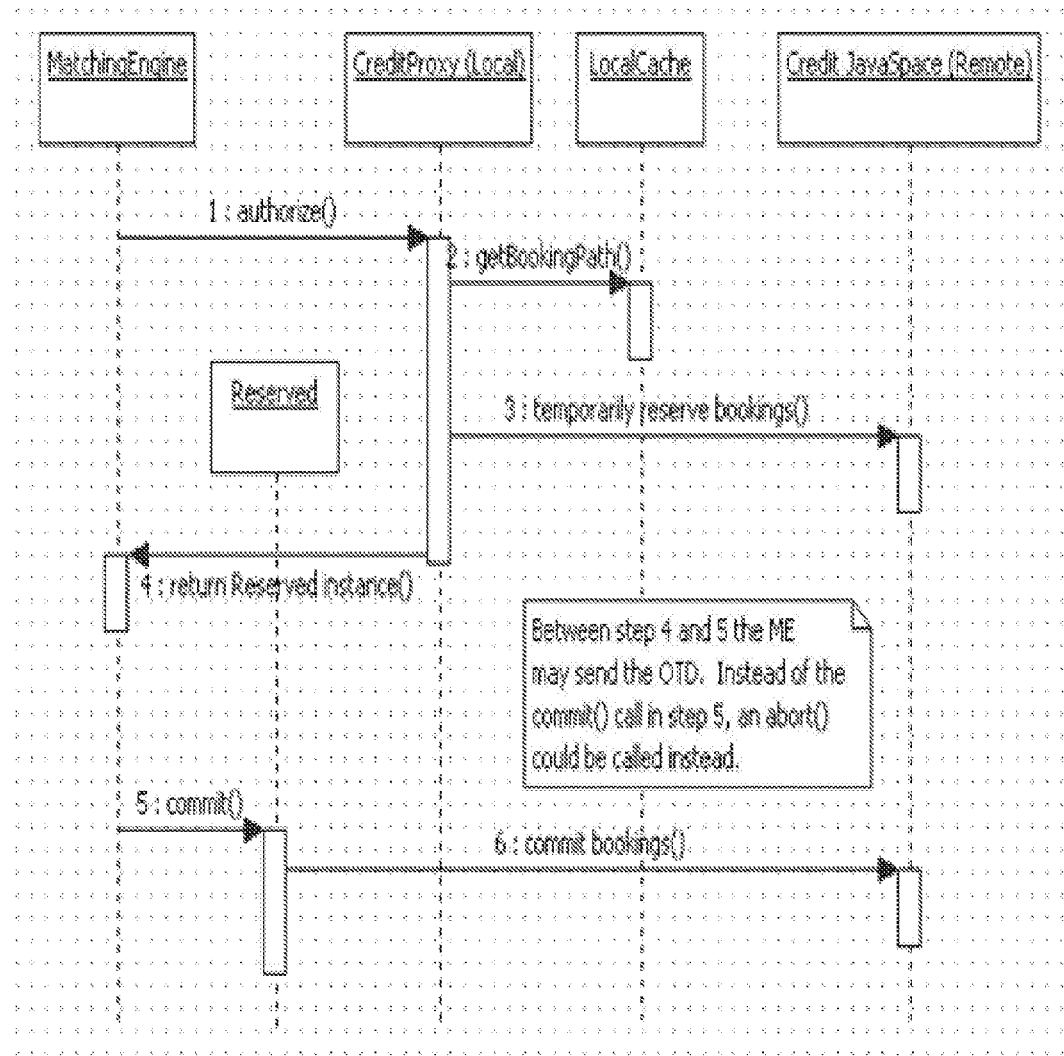
FIG. 16 shows a sequence diagram illustrating the logical flow of an object-oriented programming method call that could be used in one embodiment of the invention to select and credit check an optimal credit path.

FIG. 16 shows a sequence diagram illustrating the logical flow of the authorize method call.

The getCreditIntermediaries( ) method, shown below, obtains a list of the credit intermediaries for a supplied credit entity. This list is used to identify the best credit path for a matched pair of orders based on the preferred counterparty rankings provided by the credit entity.

```
/**
 * get all credit intermediaries for a particular entity
 * @param entity the subordinate of the credit relationship
 * @return orders are sorted from most preferred to least
   preferred
 */
CreditEntity[ ] getCreditIntermediaries(CreditEntity entity);
```

Credit Relationship Classes

In preferred embodiments of the credit data processing system, three variations of classes are defined to hold credit relationship data: CreditLine, RealCreditLine and Line.

CreditLine—Represents the open position as a float for faster performance. This class is used primarily within the proxy to speed the credit authorization. In the case of a Subordinate-Credit Intermediary relationship, this instance will represent a consolidated instance of the two lines.

RealCreditLine—Represents the open position as BigDecimal for accuracy. This class is used during the commit call that occurs post trade. In the case of a Subordinate-Credit Intermediary relationship, this instance will represent a consolidated instance of the two lines.

Line—Represents a line from the database. This class is used within the credit administration module. In the case of a Subordinate-Credit Intermediary relationship, there will be two instances of this class, one for the subordinate credit line and one for the credit intermediary credit line.

Figure 17:
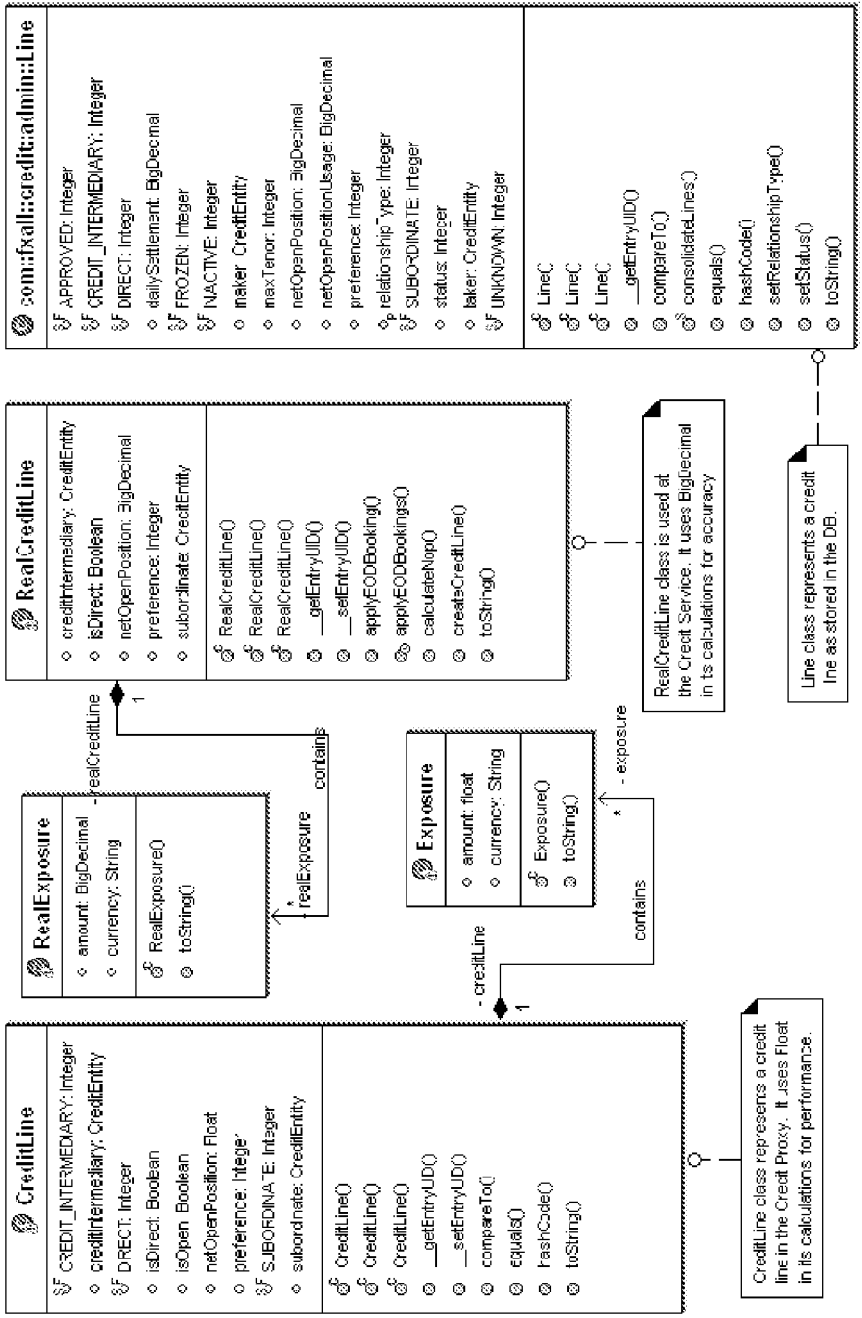
FIG. 17 contains a graphical illustration of three credit classes that may be used to implement an embodiment of the invention.

FIG. 17 contains a graphical illustration of these three credit classes.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the structures and the combination of the individual elements may be resorted to without departing from the spirit and scope of the invention.

What is claimed is:

1. A credit data processing system for controlling trade executions carried out on an electronic trading system based on existing credit arrangements, comprising:

a non-transitory computer-readable storage medium that stores information representing a credit relationship network, the credit relationship network comprising a plurality of credit entities, a preferred counterparty ranking provided by each credit entity, and a plurality of credit relationships between at least some of said credit entities, each credit relationship comprising a credit limit and a net open position;

an interface to the electronic trading system; and a credit data processor programmed to:

(a) receive from the electronic trading system via said interface a request to confirm a sufficient credit arrangement to permit execution of a matched pair of orders, the matched pair of orders comprising an aggressor order received from an aggressor counterparty in the credit relationship network, a passive order received from a passive counterparty in the credit relationship network, and an order amount;

(b) determine, based on the information stored in the computer-readable storage medium, a set of potential credit paths comprising a plurality of routes through the credit relationship network, wherein each route links the aggressor counterparty to the passive counterparty through one or more credit intermediaries, and each route comprises two or more credit legs corresponding respectively to two or more credit relationships existing between the aggressor counterparty, the passive counterparty and said one or more credit intermediaries (c) select an optimal credit path from the set of potential credit paths based on the preferred counterparty rankings provided by the aggressor counterparty, the passive counterparty and said one or more credit intermediaries in the plurality of potential credit paths, (d) determine whether sufficient credit is available on every credit leg in the selected optimal credit path by comparing the sum of the order amount and the net open position for said every credit leg to the credit limit on said every credit leg, (e) when the sum of the order amount and the net open position on any credit leg in the selected optimal credit path exceeds the credit limit for said any credit leg, delete from the set of potential credit paths the selected optimal credit path and every other potential credit path that encompasses said any credit leg, (f) send a credit confirmation notice to the electronic trading system when the sum of the order amount and the net open position on every credit leg in the selected optimal credit path does not exceed the credit limit for said every credit leg, and (g) repeat steps (c) through (f) until the credit confirmation notice is sent or the set of potential credit paths is empty.

2. The credit data processing system of claim 1, wherein the credit data processor is further configured to store the selected optimal credit path in the non-transitory computer-readable storage medium.

3. The credit data processing system of claim 2, wherein, in response to receiving the credit confirmation notice from the credit data processor, the electronic trading system retrieves the selected optimal credit path from the non-transitory computer-readable storage medium and executes a series of trades involving all of the credit entities in the selected optimal credit path.

4. The credit data processing system of claim 3, wherein the credit data processor is further programmed to:

calculate, based on the order amount and the net open positions for the credit legs in the selected optimal credit path, a plurality of new net open positions for said credit legs in the selected optimal credit path; and store the plurality of new net open positions in the non-transitory computer-readable storage medium.

5. The credit data processing system of claim 1, wherein, in response to receiving the credit confirmation from the credit data processor, the electronic trading system is programmed to: send an offer to deal from the electronic trading system to a provider trading system; receive an acceptance responsive to the offer to deal; and in response to receiving the acceptance, execute a series of trades involving all of the credit entities in the selected optimal credit path.

6. The credit data processing system of claim 5, wherein the credit data processor is further programmed to: calculate, based on the order amount and the net open positions for the credit legs in the selected optimal credit path, a plurality of new net open positions for said credit legs in the selected optimal credit path; and store the plurality of new net open positions in the non-transitory computer-readable storage medium.

7. The credit data processing system of claim 1, wherein a sufficient credit arrangement comprises:

one or more credit relationships in the credit relationship network directly or indirectly linking the aggressor counterparty to the passive counterparty; and sufficient credit limits for each of said one or more credit relationships to accommodate a trade for said order amount.

8. The credit data processing system of claim 1, wherein the request comprises one or more of:

a buyer credit entity identifier, a seller credit entity identifier, a buy currency, a buy amount, a sell currency, a sell amount, a buyer order identifier, a seller order identifier, a deal type, and a value date.

9. The credit data processing system of claim 1, wherein the request comprises all of:

a buyer credit entity identifier, a seller credit entity identifier, a buy currency, a buy amount, a sell currency, a sell amount, a buyer order identifier, a seller order identifier, a deal type, and a value date.

10. The credit data processing system of claim 1, wherein the credit data processor is further programmed to send a credit failure notice to the electronic trading system if the set of potential credit paths is empty.

11. The credit data processing system of claim 10, wherein the credit failure notice comprises at least one of:

a credit failure type, a credit failure party, and an order identifier.

12. The credit data processing system of claim 1, further comprising:

a plurality of connections to a respective plurality of computers operated by the plurality of credit entities; and a credit administrator module programmed to:

(i) receive from the plurality of credit entities via the plurality of connections credit data pertaining to the plurality of credit relationships, (ii) generate the information representing the credit relationship network based at least in part on the credit data, and (iii) store the information in the non-transitory computer-readable storage medium.

13. The credit data processing system of claim 12, wherein the credit administrator module is further programmed to create the information based at least in part on data received from a centralized credit administrator.

14. The credit data processing system of claim 12, wherein the information comprises a database comprising a plurality of records, each record being programmed to hold a plurality of values associated with a credit relationship in the plurality of credit relationships, said plurality of values including a credit maker, a credit taker, a credit account, a credit relationship type, the credit limit, the preferred counterparty ranking and the net open position.

15. The credit data processing system of claim 12, wherein the information comprises:

a plurality of credit relationship objects, each credit relationship object comprising a plurality of data members configured to hold values associated with a credit relationship in the plurality of credit relationships, said plurality of values including a credit maker, a credit taker, a credit account, a credit relationship type, the credit limit, the preferred counterparty ranking and the net open position; and a plurality of methods for accessing the values held in said data members in a predefined way.

16. A method of using a computer processor to control trade executions carried out on an electronic trading system based on existing credit arrangements, the method comprising:

(a) storing in a non-transitory computer-readable storage medium accessible to the computer processor information representing a credit relationship network, the credit relationship network comprising a plurality of credit entities, a preferred counterparty ranking provided by each credit entity, and a plurality of credit relationships between at least some of said credit entities, each credit relationship comprising a credit limit and a net open position;

(b) receiving from the electronic trading system a request to confirm a sufficient credit arrangement to permit execution of a matched pair of orders, the matched pair of orders comprising an aggressor order received from an aggressor counterparty in the credit relationship network, a passive order received from a passive counterparty in the credit relationship network, and an order amount;

(c) determining by the computer processor, based on the information stored in the non-transitory computer-readable storage medium, a set of potential credit paths comprising a plurality of routes through the credit relationship network, wherein each route indirectly links the aggressor counterparty to the passive counterparty through one or more credit intermediaries, and each route comprises two or more credit legs corresponding respectively to two or more credit relationships existing between the aggressor counterparty, the passive counterparty and said one or more credit intermediaries, (d) selecting by the computer processor an optimal credit path from the set of potential credit paths based on the preferred counterparty rankings provided by the aggressor counterparty, the passive counterparty and said one or more credit intermediaries in the plurality of potential credit paths, (e) determining by the computer processor whether sufficient credit is available on every credit leg in the selected optimal credit path by comparing the sum of the order amount and the net open position for said every credit leg to the credit limit on said every credit leg, (f) when the computer processor determines that the sum of the order amount and the net open position on any credit leg in the selected optimal credit path exceeds the credit limit for said any credit leg, deleting from the set of potential credit paths the selected optimal credit path and every other potential credit path that encompasses said any credit leg, (g) sending by the computer processor a credit confirmation notice to the electronic trading system when the sum of the order amount and the net open position on every credit leg in the selected optimal credit path does not exceed the credit limit for said every credit leg, and (h) repeat steps (d) through (g) until the credit confirmation notice is sent or the set of potential credit paths is empty.

17. The method of claim 16, further comprising storing the selected optimal credit path in the non-transitory computer-readable storage medium.

18. The method of claim 17, further comprising retrieving, by the computer processor, the selected optimal credit path from the non-transitory computer-readable storage medium and executing on the electronic trading system a series of trades involving all of the credit entities in the selected optimal credit path.

19. The method of claim 18, further comprising:
using the computer processor to calculate, based on the order amount and the net open positions for the credit legs in the selected optimal credit path, a plurality of new net open positions for said credit legs in the selected optimal credit path; and
storing the plurality of new net open positions in the non-transitory computer-readable storage medium.

20. The method of claim 16, further comprising:
sending from the electronic trading system to a provider trading system an offer to deal;
receiving on the electronic trading system an acceptance responsive to the offer to deal; and
responsive to the acceptance, executing a series of trades on the electronic trading system involving all of the credit entities in the selected optimal credit path.

21. The method of claim 20, further comprising:
calculating, by the computer based on the order amount and the net open positions for the credit legs in the selected optimal credit path, a plurality of new net open positions for said credit legs in the selected optimal credit path; and
storing the plurality of new net open positions in the non-transitory computer-readable storage medium.

22. The method of claim 16, wherein a sufficient credit arrangement comprises:
one or more credit relationships in the credit relationship network directly or indirectly linking the aggressor counterparty to the passive counterparty; and
sufficient credit limits for each of said one or more credit relationships to accommodate a trade for said order amount.

23. The method of claim 16, wherein the request comprises one or more of:
a buyer credit entity identifier, a seller credit entity identifier, a buy currency, a buy amount, a sell currency, a sell amount, a buyer order identifier, a seller order identifier, a deal type, and a value date.

24. The method of claim 16, wherein the request comprises all of:
a buyer credit entity identifier, a seller credit entity identifier, a buy currency, a buy amount, a sell currency, a sell amount, a buyer order identifier, a seller order identifier, a deal type, and a value date.

25. The method of claim 16, further comprising sending from the computer processor a credit failure notice if the set of potential credit paths is empty.

26. The method of claim 25, wherein the credit failure notice comprises at least one of:
a credit failure type, a credit failure party, and an order identifier.

27. The method of claim 16, further comprising:
receiving from a plurality computer systems operated by the plurality of credit entities credit data comprising the plurality of credit relationships;
creating, by the computer processor, the information representing the credit relationship network based at least in part on the data; and
storing the information in the non-transitory computer-readable storage medium.

28. The method of claim 27, further comprising creating the information representing the credit relationship network based at least in part on data provided by a centralized credit administrator.

29. The method of claim 27, further comprising populating, with the computer processor, a plurality of database records, each database record being configured to hold a plurality of values associated with a credit relationship in the plurality of credit relationships, said plurality of values including a credit maker, a credit taker, a credit account, a credit relationship type, the credit limit, the preferred counterparty ranking and the net open position.

30. The method of claim 27, wherein creating the information by the computer processor comprises:
creating with the computer processor a plurality of credit relationship objects, each credit relationship object comprising a plurality of data members configured to hold values associated with a credit relationship in the plurality of credit relationships, said plurality of values including a credit maker, a credit taker, a credit account, a credit relationship type, the credit limit, the preferred counterparty ranking and the net open position; and executing on the computer processor a plurality of methods to modify the values held in said data members.

31. A credit data processing system for controlling trade executions carried out on an electronic trading system based on existing credit arrangements, comprising:
- a non-transitory computer-readable storage medium that stores information representing a credit relationship network, the credit relationship network comprising a plurality of credit entities, a preferred counterparty ranking provided by each credit entity, and a plurality of credit relationships between at least some of said credit entities, each credit relationship comprising a credit limit and a net open position;
- an interface to the electronic trading system; and
- a credit data processor programmed to:
  - (a) receive from the electronic trading system via said interface a request to confirm a sufficient credit arrangement to permit execution of a matched pair of orders, the matched pair of orders comprising an aggressor order received from an aggressor counterparty in the credit relationship network, a passive order received from a passive counterparty in the credit relationship network, and an order amount;
  - (b) determine, based on the information stored in the non-transitory computer-readable storage medium, a potential credit path comprising a route through the credit relationship network, wherein the route links the aggressor counterparty to the passive counterparty through one or more credit intermediaries, and the route comprises two or more credit legs corresponding respectively to two or more credit relationships existing between the aggressor counterparty, the passive counterparty and said one or more credit intermediaries,
  - (c) determine whether sufficient credit is available on every credit leg in the potential credit path by comparing the sum of the order amount and the net open position for said every credit leg to the credit limit on said every credit leg,
  - (d) send a credit rejection notice to the electronic trading system when the sum of the order amount and the net open position on any credit leg in the potential credit path exceeds the credit limit for said any credit leg, and
  - (e) send a credit confirmation notice to the electronic trading system when the sum of the order amount and the net open position on every credit leg in the potential credit path does not exceed the credit limit for said every credit leg.

32. A credit data processing system for controlling trade executions carried out on an electronic trading system based on existing credit arrangements, comprising:
- (a) a memory;
- (b) a computer processor coupled to the memory;
- (c) a credit administrator module, stored in the memory, the credit administrator module having program instructions that, when executed by the computer processor, cause the computer processor to store information representing a credit relationship network on a non-transitory computer-readable medium, the credit relationship network comprising a plurality of credit entities, a preferred counterparty ranking provided by each credit entity, and a plurality of credit relationships between at least some of said credit entities, each credit relationship comprising a credit limit and a net open position;
- (d) an application programming interface, stored in the memory, having program instructions that, when executed by the computer processor, cause the computer processor to receive a request to confirm a credit arrangement to permit execution of a matched pair of orders, the matched pair of orders comprising an aggressor order received from an aggressor counterparty in the credit relationship network, a passive order received from a passive counterparty in the credit relationship network, and an order amount;
- (e) a credit path generator module, stored in the memory, having program instructions that, when executed by the computer processor, cause the computer processor to:
  - (1) determine, based on the information stored in the computer-readable storage medium, a set of potential credit paths comprising a plurality of routes through the credit relationship network, wherein each route indirectly links the aggressor counterparty to the passive counterparty through one or more credit intermediaries, and each route comprises two or more credit legs corresponding respectively to two or more credit relationships existing between the aggressor counterparty, the passive counterparty and said one or more credit intermediaries, and
  - (2) select an optimal credit path from the set of potential credit paths based on the preferred counterparty rankings provided by the aggressor counterparty, the passive counterparty and said one or more credit intermediaries in the plurality of potential credit paths, and
- (f) a credit checking module, stored in the memory, having program instructions that, when executed by the computer processor, cause the computer processor to:
  - (1) determine whether sufficient credit is available on every credit leg in the selected optimal credit path by comparing the sum of the order amount and the net open position for said every credit leg to the credit limit on said every credit leg, and
  - (2) when the sum of the order amount and the net open position on any credit leg in the selected optimal credit path exceeds the credit limit for said any credit leg, delete from the set of potential credit paths the selected optimal credit path and every other potential credit path that encompasses said any credit leg, and
  - (3) send a credit confirmation notice to the electronic trading system when the sum of the order amount and the net open position on every credit leg in the selected optimal credit path does not exceed the credit limit for said every credit leg.

* * * * *